(12) United States Patent     (10) Patent No.: US 8,544,662 B2
Smerecky et al.     (45) Date of Patent: Oct. 1, 2013

(54) CENTRAL DATUM FEATURE ON RAILROAD COUPLER BODY AND CORRESPONDING GAUGES

(71) Applicant: Bedloe Industries LLC, Wilmington, DE (US)

(72) Inventors: Jerry R. Smerecky, Roselle, IL (US); F. Andrew Nibouar, Chicago, IL (US); Edward T. Eaton, Eola, IL (US); Thomas A. Marchese, Schaumburg, IL (US); Eric W. Larson, Pecatonica, IL (US); Ronald P. Sellberg, Naperville, IL (US)

(73) Assignee: Bedloe Industries LLC, Wilmington, DE (US)

( * ) Notice: Subject to any disclaimer, the term of this patent is extended or adjusted under 35 U.S.C. 154(b) by 0 days.

(21) Appl. No.: 13/851,341

(22) Filed: Mar. 27, 2013

(65) Prior Publication Data

US 2013/0213921 A1    Aug. 22, 2013

Related U.S. Application Data

(63) Continuation of application No. 12/471,136, filed on May 22, 2009, now Pat. No. 8,408,406.

(60) Provisional application No. 61/055,390, filed on May 22, 2008.

(51) Int. Cl.
     *B61G 5/00*     (2006.01)
(52) U.S. Cl.
     USPC ..................................... 213/75 R; 213/100 R

(58) Field of Classification Search
     USPC ................. 213/100 R–109, 75 R; 29/401.1, 29/700; 33/541
     See application file for complete search history.

(56) References Cited

U.S. PATENT DOCUMENTS

| | | | |
|---|---|---|---|
| 450,947 | A | 4/1891 | Barnes |
| 491,174 | A | 2/1893 | Hazlehurst et al. |
| 892,563 | A | 7/1908 | Starbird |
| 1,346,224 | A | 7/1920 | McCormick |
| 1,382,530 | A | 6/1921 | Murphy |
| 1,638,885 | A | 8/1927 | Shea |
| 1,758,235 | A | 5/1930 | Nash |
| 1,932,440 | A | 10/1933 | Bazeley |
| 1,966,765 | A | 7/1934 | Murphy |
| 2,039,086 | A | 4/1936 | Kinne |

(Continued)

FOREIGN PATENT DOCUMENTS

| | | |
|---|---|---|
| BE | 524450 A | 5/1954 |
| CA | 485408 A | 8/1952 |

(Continued)

OTHER PUBLICATIONS

Transactions of the American Foundrymen's Society, Proceedings of the Ninety-first Annual Meeting, Apr. 5-10, 1987. vol. 95, 21 pages.

(Continued)

*Primary Examiner* — Jason C Smith
(74) *Attorney, Agent, or Firm* — Nathan O. Greene; Brinks Hofer Gilson & Lione

(57) ABSTRACT

A coupler body for a railcar coupler, said coupler body comprising at least one central datum feature that does not wear during coupler use.

28 Claims, 23 Drawing Sheets

(56) References Cited

U.S. PATENT DOCUMENTS

| | | |
|---|---|---|
| 2,088,135 A | 7/1937 | Johnson et al. |
| 2,350,470 A | 6/1944 | Metzger |
| 2,617,540 A | 11/1952 | Metzger |
| 2,688,412 A | 9/1954 | Kulieke |
| 2,709,007 A | 5/1955 | Metzger |
| 2,760,652 A | 8/1956 | Blattner |
| 2,909,293 A | 10/1959 | Metzger |
| 2,948,414 A | 8/1960 | Metzger |
| 2,959,299 A | 11/1960 | Metzger |
| 3,121,498 A | 2/1964 | Sudeck |
| 3,168,202 A | 2/1965 | Cope |
| 3,206,039 A | 9/1965 | Metzger |
| 3,572,518 A | 3/1971 | Wisler |
| 3,604,569 A | 9/1971 | Kulieke |
| 3,613,902 A | 10/1971 | Altherr |
| 3,627,145 A | 12/1971 | Altherr |
| 3,635,356 A | 1/1972 | Shramovich |
| 3,635,358 A | 1/1972 | Altherr |
| 3,637,089 A | 1/1972 | Jwuc et al. |
| 3,640,402 A | 2/1972 | Altherr et al. |
| 3,670,901 A | 6/1972 | Metzger |
| 3,675,787 A | 7/1972 | Krauskopf |
| 3,698,570 A | 10/1972 | Metzger |
| 3,698,571 A | 10/1972 | Hawthorne |
| 3,717,261 A | 2/1973 | DePenti |
| 3,722,708 A | 3/1973 | Ion et al. |
| 3,735,877 A | 5/1973 | Bossong |
| 3,767,062 A | 10/1973 | Holibaugh |
| 3,779,397 A | 12/1973 | DePenti |
| 3,833,131 A | 9/1974 | Altherr |
| 3,850,311 A | 11/1974 | Kaufhold |
| 3,850,312 A | 11/1974 | Baker, Sr. |
| 3,853,228 A | 12/1974 | Metzger |
| 3,854,599 A | 12/1974 | Day et al. |
| 3,856,154 A | 12/1974 | DePenti |
| 3,856,155 A | 12/1974 | Altherr |
| 3,856,156 A | 12/1974 | Metzger |
| 3,857,495 A | 12/1974 | Kaufhold |
| 3,858,729 A | 1/1975 | Altherr |
| 3,860,121 A | 1/1975 | Snell |
| 3,872,978 A | 3/1975 | Altherr |
| 3,881,602 A | 5/1975 | Altherr et al. |
| 3,923,164 A | 12/1975 | Dalton |
| 3,971,479 A | 7/1976 | DePenti |
| 3,972,421 A | 8/1976 | DePenti |
| RE29,011 E | 10/1976 | Altherr |
| 3,998,337 A | 12/1976 | Altherr |
| 4,024,958 A | 5/1977 | Kaufhold |
| 4,051,954 A | 10/1977 | Roberts |
| 4,064,998 A | 12/1977 | Dilg et al. |
| 4,081,082 A * | 3/1978 | Scherrer et al. .............. 213/62 A |
| 4,084,704 A | 4/1978 | Metzger |
| 4,084,705 A | 4/1978 | Oshinsky et al. |
| 4,090,614 A | 5/1978 | Altherr et al. |
| 4,090,615 A | 5/1978 | Martin |
| 4,093,079 A | 6/1978 | Cope |
| 4,119,209 A | 10/1978 | Jwuc |
| 4,129,219 A | 12/1978 | Polanin |
| 4,135,629 A | 1/1979 | Dilg et al. |
| 4,143,701 A | 3/1979 | Oshinsky et al. |
| 4,146,143 A | 3/1979 | Schelle |
| 4,172,530 A | 10/1979 | Altherr et al. |
| 4,206,849 A | 6/1980 | Kaim |
| 4,230,228 A | 10/1980 | Kaim |
| 4,245,747 A * | 1/1981 | Roberts .......................... 213/153 |
| 4,258,628 A | 3/1981 | Altherr |
| 4,267,935 A | 5/1981 | Dilg |
| 4,287,834 A * | 9/1981 | Zehnder et al. ................ 105/420 |
| 4,316,549 A | 2/1982 | Klimowicz |
| 4,333,576 A | 6/1982 | Kaim |
| 4,363,414 A | 12/1982 | Kaim |
| 4,391,380 A | 7/1983 | Hoose |
| 4,398,641 A | 8/1983 | Klimowicz |
| 4,426,012 A | 1/1984 | Adams, III et al. |
| 4,438,854 A | 3/1984 | Baughman et al. |
| 4,438,855 A | 3/1984 | Altherr |
| 4,445,617 A | 5/1984 | Elliott |
| 4,452,299 A | 6/1984 | Gruber et al. |
| 4,466,546 A | 8/1984 | Altherr et al. |
| 4,474,732 A | 10/1984 | Lynn |
| 4,480,758 A | 11/1984 | Hurt et al. |
| 4,585,133 A | 4/1986 | Cope |
| 4,595,109 A | 6/1986 | McClurg |
| 4,605,133 A | 8/1986 | Altherr |
| 4,637,518 A | 1/1987 | Hanula |
| 4,640,422 A | 2/1987 | Elliott |
| 4,645,085 A * | 2/1987 | Hanula et al. .................. 213/155 |
| 4,706,826 A * | 11/1987 | Elliott et al. ..................... 213/61 |
| 4,776,474 A | 10/1988 | Terlecky et al. |
| 4,811,854 A | 3/1989 | Elliott |
| 4,848,611 A | 7/1989 | Terlecky et al. |
| 4,927,035 A * | 5/1990 | Geng et al. ....................... 213/77 |
| 4,976,362 A | 12/1990 | Kaufhold |
| 4,976,363 A | 12/1990 | Altherr |
| 4,982,781 A | 1/1991 | Carpenter et al. |
| 4,984,696 A | 1/1991 | Altherr |
| 5,050,751 A | 9/1991 | Thrift et al. |
| 5,139,161 A | 8/1992 | Long |
| 5,145,076 A | 9/1992 | Murphy et al. |
| 5,201,827 A * | 4/1993 | Glover et al. .................... 213/61 |
| 5,285,911 A | 2/1994 | Altherr |
| 5,305,899 A | 4/1994 | Kaufhold |
| 5,312,007 A | 5/1994 | Kaufhold et al. |
| 5,415,304 A | 5/1995 | Hanes et al. |
| 5,424,376 A | 6/1995 | Chang et al. |
| 5,427,257 A | 6/1995 | Hanes et al. |
| 5,482,675 A | 1/1996 | Shotwell et al. |
| D369,756 S | 5/1996 | Noel |
| 5,582,307 A | 12/1996 | Hawthorne et al. |
| 5,630,519 A | 5/1997 | Burke et al. |
| 5,833,086 A | 11/1998 | Kaufhold |
| 5,878,897 A | 3/1999 | Lazzaro et al. |
| 5,927,522 A | 7/1999 | Carifa |
| 5,954,212 A | 9/1999 | Beatty et al. |
| 6,000,564 A * | 12/1999 | Grau et al. ................. 213/100 R |
| 6,005,021 A | 12/1999 | Chen et al. |
| 6,062,406 A | 5/2000 | Duncan |
| 6,129,227 A | 10/2000 | Openchowski et al. |
| 6,148,733 A | 11/2000 | Gagliardino |
| 6,167,813 B1 * | 1/2001 | Kaufhold et al. .................. 105/3 |
| 6,206,215 B1 | 3/2001 | Maa |
| 6,237,785 B1 | 5/2001 | Daugherty, Jr. |
| 6,360,906 B1 | 3/2002 | Kaufhold et al. |
| 6,446,820 B1 | 9/2002 | Barker et al. |
| 6,488,163 B1 | 12/2002 | Wurzer et al. |
| 6,681,943 B2 * | 1/2004 | Barker et al. ................ 213/75 R |
| 6,758,919 B2 | 7/2004 | Milligan |
| 6,783,610 B2 | 8/2004 | Shirley et al. |
| 6,796,448 B1 | 9/2004 | Wilt et al. |
| 6,944,925 B2 | 9/2005 | Brueckert et al. |
| 7,020,977 B2 | 4/2006 | Brueckert et al. |
| 7,059,062 B2 | 6/2006 | Brueckert et al. |
| 7,143,522 B2 | 12/2006 | Brueckert et al. |
| 7,171,734 B2 | 2/2007 | Brueckert et al. |
| 7,171,758 B2 | 2/2007 | Brueckert et al. |
| 7,302,994 B2 | 12/2007 | Mautino et al. |
| 7,337,826 B2 | 3/2008 | Mautino et al. |
| 7,360,318 B2 | 4/2008 | Brueckert et al. |
| 2003/0127412 A1 | 7/2003 | Mautino et al. |
| 2004/0173555 A1 | 9/2004 | Wilt et al. |
| 2005/0160581 A1 | 7/2005 | Brueckert et al. |
| 2005/0160582 A1* | 7/2005 | Brueckert et al. ........... 29/602.1 |
| 2005/0160584 A1* | 7/2005 | Brueckert et al. ........... 29/602.1 |
| 2005/0184021 A1 | 8/2005 | Mautino et al. |
| 2006/0113267 A1 | 6/2006 | Mautino et al. |
| 2007/0084818 A1 | 4/2007 | Brabb et al. |
| 2007/0125510 A1 | 6/2007 | Mautino et al. |
| 2007/0130773 A1 | 6/2007 | Brueckert et al. |
| 2008/0083690 A1 | 4/2008 | Mautino et al. |
| 2008/0272081 A1* | 11/2008 | Sprainis et al. ............. 213/40 R |
| 2009/0289021 A1 | 11/2009 | Smerecky et al. |
| 2009/0289022 A1 | 11/2009 | Smerecky et al. |
| 2009/0289023 A1 | 11/2009 | Marchese et al. |
| 2009/0289024 A1* | 11/2009 | Nibouar et al. ............. 213/75 R |

| | | | |
|---|---|---|---|
| 2009/0294395 A1 | 12/2009 | Smerecky | |
| 2009/0294396 A1* | 12/2009 | Smerecky et al. | 213/75 R |
| 2010/0270253 A1* | 10/2010 | Kontetzki | 213/185 |
| 2011/0168655 A1 | 7/2011 | Nibouar et al. | |

FOREIGN PATENT DOCUMENTS

| | | | |
|---|---|---|---|
| CA | 510469 A | 3/1955 | |
| CA | 753964 A | 3/1957 | |
| CA | 540837 A | 5/1957 | |
| CA | 547137 A | 10/1957 | |
| CA | 905353 A | 7/1972 | |
| CA | 1022116 A1 | 12/1977 | |
| CA | 1034085 A1 | 7/1978 | |
| CA | 1039683 A1 | 10/1978 | |
| CA | 1041050 A1 | 10/1978 | |
| CA | 1045085 A1 | 12/1978 | |
| CA | 1079234 A1 | 6/1980 | |
| CA | 1087135 A1 | 10/1980 | |
| CA | 1089808 A1 | 11/1980 | |
| CA | 1093021 A1 | 1/1981 | |
| CA | 1098869 A1 | 4/1981 | |
| CA | 1108560 A1 | 9/1981 | |
| CA | 1195660 A1 | 10/1985 | |
| CA | 1226244 A1 | 9/1987 | |
| CA | 1251170 A1 | 3/1989 | |
| CA | 2027987 A1 | 5/1991 | |
| CA | 2054390 A1 | 5/1992 | |
| CA | 2171030 A1 | 11/1996 | |
| CA | 2260658 A1 | 9/1999 | |
| CA | 2395875 A1 | 7/2003 | |
| CA | 2573306 A1 | 2/2006 | |
| EP | 1531018 A1 | 5/2005 | |
| GB | 185657 A | 9/1922 | |
| GB | 221691 A | 9/1924 | |
| GB | 326575 A | 3/1930 | |
| GB | 355247 A | 8/1931 | |
| GB | 743098 A | 1/1956 | |
| GB | 902971 A | 8/1962 | |
| GB | 1477368 A | 6/1977 | |
| GB | 2300611 A | 11/1996 | |
| WO | WO 01/81024 A1 | 11/2001 | |
| WO | WO 2006/017412 A1 | 2/2006 | |
| WO | WO 2009/142746 A1 | 11/2009 | |
| WO | WO 2009/142747 A1 | 11/2009 | |
| WO | WO 2009/142748 A1 | 11/2009 | |
| WO | WO 2009/142749 A1 | 11/2009 | |
| WO | WO 2009/142750 A1 | 11/2009 | |
| WO | WO 2009/142757 A1 | 11/2009 | |
| WO | WO 2011/084992 A1 | 7/2011 | |

OTHER PUBLICATIONS

Unknown Author, "A.R.A. Type "E" Coupler," Railway Mechanical Engineer, May 1932, pp. 207-208.

Unknown Author, "Report on Couplers and Draft Gears," Railway Mechanical Engineer, Jul. 1933, pp. 243-244.

Unknown Author, "Steel Castings Handbook," 6th Edition, Steel Founders' Society of America, © 1995, 3 pages.

Walton, Charles F. et al., "Iron Castings Handbook," Iron Castings Society, Inc., © 1981, 5 pages.

Office Action from co-pending U.S. Appl. No. 12/471,029, dated Feb. 16, 2011, 9 pages.

Office Action from co-pending U.S. Appl. No. 12/470,915, dated Feb. 16, 2011, 8 pages.

Office Action from co-pending U.S. Appl. No. 12/471,110, dated Mar. 17, 2011, 11 pages.

Office Action from co-pending U.S. Appl. No. 12/471,053, dated Mar. 21, 2011, 12 pages.

Office Action from co-pending U.S. Appl. No. 12/685,346, dated Aug. 16, 2011, 7 pages.

Office Action from co-pending U.S. Appl. No. 12/470,883, dated Mar. 2, 2011, 8 pages.

Office Action from co-pending U.S. Appl. No. 12/470,883, dated Sep. 21, 2011, 8 pages.

International Search Report for International Application No. PCT/US2009/003154, dated Sep. 3, 2009, 3 pages.

Office Action from co-pending U.S. Appl. No. 12/471,136, dated Jun. 21, 2011, 9 pages.

Office Action from co-pending U.S. Appl. No. 12/471,136, dated Dec. 2, 2011, 20 pages.

Office Action from co-pending U.S. Appl. No. 12/471,136, dated May 9, 2012, 10 pages.

Office Action from co-pending U.S. Appl. No. 12/471,136, dated Jul. 24, 2012, 8 pages.

* cited by examiner

CENTRAL DATUM FEATURE ON RAILROAD COUPLER BODY AND CORRESPONDING GAUGES

RELATED APPLICATION

This application claims priority to U.S. patent application Ser. No. 12/471,136, filed May 22, 2009, now U.S. Pat. No. 8,408,406 B2, which claims priority to U.S. Provisional Patent Application No. 61/055,390, filed May 22, 2008, the disclosure of which are incorporated herein by this reference.

FIELD OF INVENTION

The present invention relates generally to the field of railroad couplers, and more specifically to gauging of railroad couplers and/or features on the coupler body that assist in locating the gauge as well as gauges and devices that are useful for reconditioning railcar couplers.

BACKGROUND

As is widely known, freight car coupler assemblies and the components that make up the assemblies wear in service over time due to in service loads, natural corrosion, and natural wear and tear after thousands of miles on the rails. These worn features leave larger clearances between parts which causes more shock load on starts and stops, and increases the risk of failure. As a result, the railroad industry limits the amount of wear that can occur in a coupler assembly. These limits are typically determined through the use of gauges. Coupler assemblies that do not pass acceptable gauging criteria must be removed from the freight cars and replaced. Some parts, if heavily warn, may have to be scrapped. However, the coupler assembly, or at least some of its parts, may qualify for reconditioning by industry approved coupler reconditioners.

Theoretically, a single coupler body could be reconditioned indefinitely through a process of welding, grinding, gauging and heat treating. Reconditioning can partially restore the overall integrity of the coupler body more economically than replacing the entire coupler. However, reconditioning coupler bodies indefinitely is not currently realistic for three reasons: a) there is no established method to recondition certain coupler body features, b) certain features are very difficult to reach and restore with commonly or traditionally available shop equipment in an economically efficient manner and c) there is no way to reestablish a wearing feature's nominal position in space relative to the rest of the coupler body and its other wearing features when they were originally manufactured.

Coupler bodies are currently finished, reconditioned, or second-hand classified by referencing various features of the coupler body that may or may not be associated with one another. When service-worn castings are reconditioned, the surfaces that were previously used to gauge and then finish a new casting become unreliable for use as gauging surfaces since they are now worn. Gauging from a worn surface to finish a surface usually produces inconsistent finishing results. There is a need for a new finishing, reconditioning, or second-hand classification system that uses features that do not change over time due to natural wear or that can be used to establish a central datum feature.

SUMMARY OF INVENTION

In a first embodiment, a coupler body for a railcar coupler is provided that comprises at least one central datum feature that does not wear during coupler use.

In a second embodiment, a railcar coupler body finishing, reconditioning or second-hand classification system is provided that comprises at least one central datum feature that does not wear during coupler use.

In a third embodiment, a gauge for use in reconditioning a railcar coupler body is provided that corresponds to a drain hole of said coupler body that does not wear during coupler use.

In a fourth embodiment, a gauge for use in reconditioning a railcar coupler is provided that comprises a portion that removably attaches to the shank of said coupler a section that sits on the back of the horn of said coupler.

In a fifth embodiment, a method for adding at least one central datum feature on a railcar coupler after manufacturing is provided that comprises the steps of locating a point on the surface of said coupler body and creating at least one opening in said coupler body to serve as a central datum feature using said point as a primary reference point.

In a sixth embodiment, a method for adding at least one central datum feature on a railcar coupler after manufacturing is provided that comprises the steps of locating a point on the surface of said coupler body and attaching at least one component to said coupler body to serve as a central Datum feature using said point as a primary reference point.

In a seventh embodiment, a gauge for use in a method of adding at least one central datum feature on a railcar coupler after manufacturing is provided comprising a pin that can be centered in the C10 pin slot of said coupler and having at least one centering feature thereon, a portion designed to locate against an inner wall of said railcar coupler and a section for use as a template to locate said at least one central datum feature on said railcar coupler.

In an eighth embodiment, a railcar coupler body finishing, reconditioning or second-hand classification system is provided comprising a handle designed to be attached to a welding system and shaped to be inserted through the lock chamber opening of said coupler body to reach the load face of at least one pulling lug of said railcar coupler body and allow said load face to be built up with weld, a reconditioning device designed to clamp onto at least one central datum feature of said railcar coupler body; and a grinder designed to attach to said reconditioning device to grind down said built up surface.

In a ninth embodiment, a railcar coupler body finishing, reconditioning or second hand classification system is provided that comprises a handle designed to be attached to a welding system and shaped to be inserted through the lock hole of said coupler body to reach the load face of at least one pulling lug of said railcar coupler body and allow said load face to be built up with weld, a reconditioning device designed to clamp onto at least one central datum feature of said railcar coupler body and a grinder designed to attach to said reconditioning device to grind down said built up surface.

In a tenth embodiment, a method of refinishing worn features on a railcar coupler body is provided comprising the steps of welding at least one worn area of said coupler body clamping said coupler body to a machine utilizing at least one central datum feature to locate the coupler body in said machine, and grinding said at least one welded area.

BRIEF DESCRIPTION OF THE DRAWINGS

The system may be better understood with reference to the following drawings and description. The components in the figures are not necessarily to scale, emphasis instead being placed upon illustrating the principles of the invention. More-over, in the figures, like-referenced numerals designate corresponding parts throughout the different views.

FIG. 14b is a side plan view of the coupler of FIG. 14a.

FIG. 15b is a side plan view of the coupler of FIG. 15a.

FIG. 16a is a side plan view showing a gauge attached to the coupler of FIG. 14a.

FIG. 16b is a top plan view showing the gauge of FIG. 16a attached the coupler of FIG. 14a.

FIG. 17 is a rear view of the coupler and gauge of FIG. 16a.

FIG. 18 is a perspective view of the coupler and gauge of FIG. 16a.

FIG. 19 is a perspective view of an alternative gauge on the coupler of FIG. 16a.

FIG. 21 is a side view of one of the finishing attachments of FIG. 20 in place on the gauge of FIG. 16a.

FIG. 23 is a perspective view of the finishing attachment of FIG. 21 in place on the gauge of FIG. 16a.

DETAILED DESCRIPTION OF THE DRAWINGS AND THE PRESENTLY PREFERRED EMBODIMENTS

The following definitions will be helpful in understanding the embodiments of the present invention: "NOMINAL"—Theoretically perfect target dimensions according to manufacturing drawings. "LIKE NEW"—Dimensions anywhere within acceptable manufacturing tolerance ranges according to manufacturing drawings. "WORN"—Dimensions outside of acceptable tolerance ranges and in need of reconditioning as qualified for by industry standards. "CONDEMNED"—Dimensions so far outside of acceptable tolerance ranges that the coupler body must be scrapped according to existing industry standards. This condition is not always caused by normal wear, but often by cracks and broken off geometry. A worn part could become condemned if that feature has worn, not necessarily because it is worn past a condemning limit, but because it is not allowed to be reconditioned.

Figure 1:
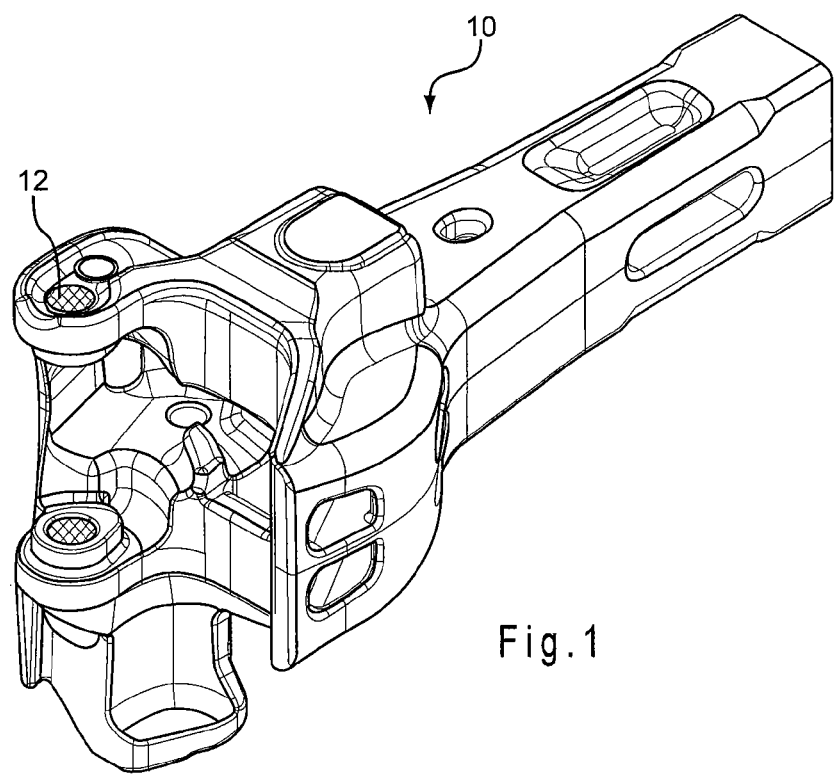
FIG. 1 is a perspective view of a coupler with the knuckle and lock removed and certain parts shaded.
Figure 2:
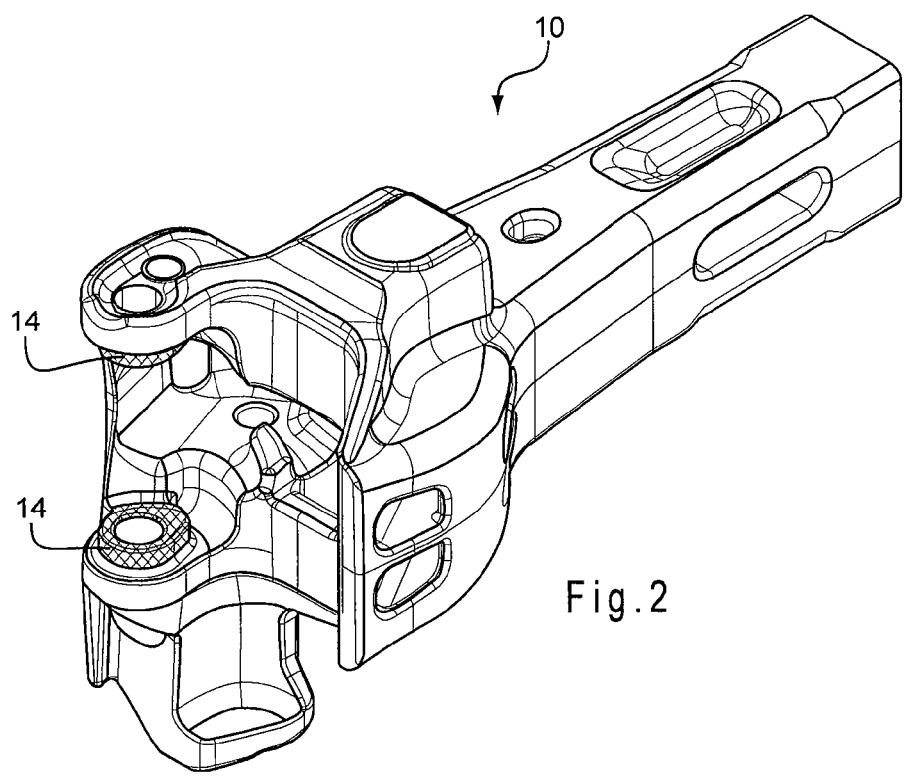
FIG. 2 is a perspective view of a coupler with the knuckle and lock removed and certain parts shaded.
Figure 3:
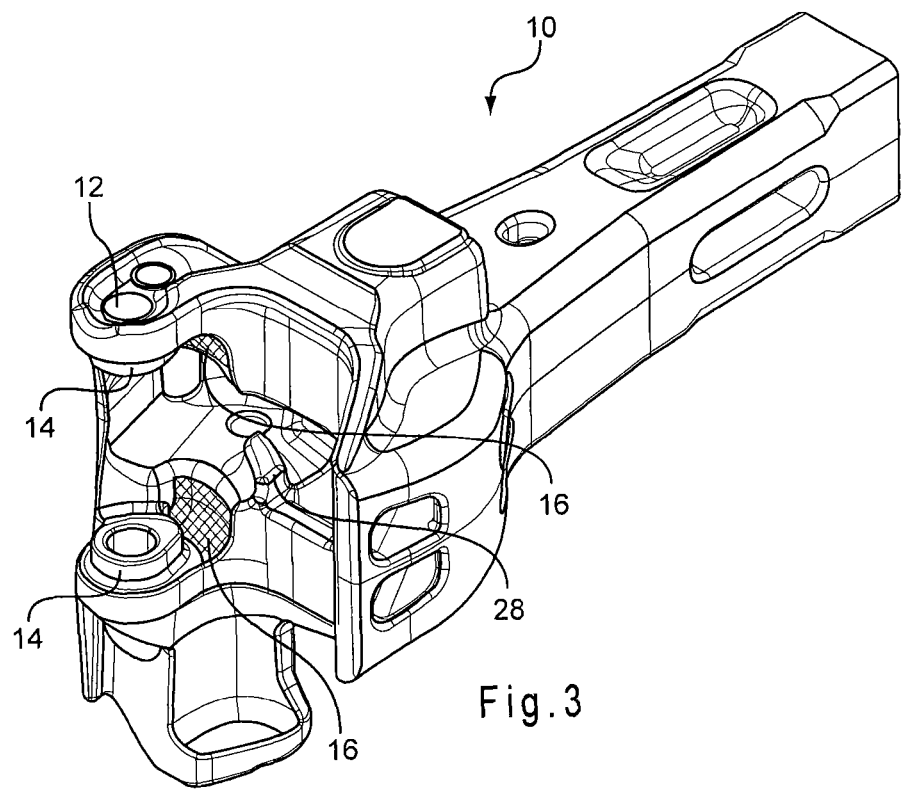
FIG. 3 is a perspective view of a coupler with the knuckle and lock removed and certain parts shaded.

There are currently four new primary areas of concern on a coupler body 10 that will require it to be reconditioned, or the present AAR specifications M212 prevent them from being reconditioned. The C10 pin slot 12 (FIG. 1) is one of the most common features that renders a coupler body 10 unfit for reconditioning. Currently the C10 pin slot 12 may only be welded to blend with interior and outside worn surfaces if there is a crack or other malformation. The specification does not allow rebuilding of worn surfaces. It is impossible to reestablish the correct location of the worn pin slot 12 relative to other functional features. M212 allows a refinisher to adjust the top, or horizontal, surface of the pin protectors 14 (FIG. 2) and to re-establish the outer vertical walls to blend with the rest of the worn surface. However, M212 specifically states, "Weld on vertical surface of pin protector boss to restore wear is prohibited." The buffing shoulders 16 and pulling lugs 28 (FIG. 3) bear much of the load transmitted through the coupler body 10. However, these features are not currently allowed to be reconditioned, specifically because of the difficulty in determining their nominal position, their nominal position to other features, and to a smaller degree maneuvering a grinder, welder, or similar tool around the coupler's cored interior.

Figure 4:
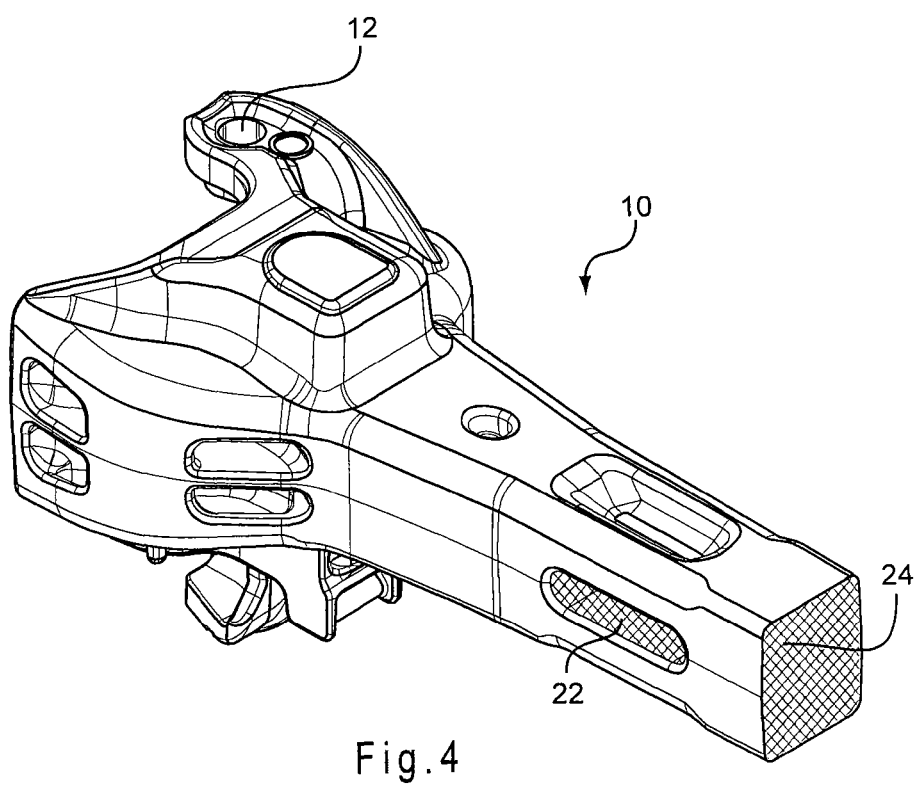
FIG. 4 is a rear perspective view of the coupler of FIG. 1.

There are two areas on the shank end 20 of the coupler 10 (FIG. 4) that show considerable wear: the key slot 22 and the butt end 24. Current reconditioning methods reconstruct the butt end 24 of the coupler by reconditioning the key slot 22 relative to the butt end 24, and reconditioning the butt end 24 relative to the rear face of the horn 26. The proposed system uses a combination of a novel gauge along with either existing features on the coupler body 10 that do not typically wear over time, or in conjunction with additional features that are added to the coupler body and that do not wear over time.

The creation of a "Centralized Datum Feature" (CDF) addresses the problem of establishing the nominal position of a wearing feature relative to the rest of the coupler body when it was originally manufactured. By incorporating a CDF in the design of a coupler body it is possible to locate functional features of the body to the CDF and to each other. This was not previously possible. At the time of reconditioning it is also possible to relate the worn dimensions of the functional features to the CDF. By having these abilities, it is possible to restore the functional features of the coupler body that previously prevented the reuse of that body. One aspect of the present invention addresses the current limitations on reconditioning coupler bodies through the creation of a "non-wearing centralized datum feature" ("Central Datum Feature" or "CDF"). That is, a method for reestablishing the relative size and position of certain wearing features that would allow a used coupler that is currently condemned as scrap to be returned to service in a "like new" condition according to AAR M212 specifications. Additionally, CDFs may be used as reference points to reconstruct worn surfaces that are not currently allowed to be reconditioned under industry specifications because there is no means to determine how to recondition the feature.

The present invention is a system that includes the addition of CDFs, gauges that use an existing feature or features or surface or surfaces that will not wear over time to locate a gauging unit or device that can be consistently positioned regardless of age (or wear) of the coupler body, gauges that use the additional CDFs to allow these features to be consistently repositioned and devices for finishing the surfaces.

In one embodiment of the present invention, a CDF is cast in, or attached with another method known in the art such as welding or drilling, as specific "non-wearing" features. Alternatively, existing features may be used as measurement points for reconditioning wearing features. This method of applying a specific datum feature at production provides superior accuracy in reconditioning as compared with attempts to reestablish the relative location of key features whose specific nominal dimensions and tolerances may or may not be known. Casting features for later reference allows these features to be placed in locations that receive little to no wear. It also holds the "datum features" in location relative to the wearing features that will need to be checked in the future.

For these features to be "non-wearing", they must be placed in a location on the body that will not deform over time or be subject to wear from contact with other components inside or outside the assembly. A gauge that will interact with a CDF of the present invention will only work with coupler bodies that have these specific CDFs cast (or added in some other way) into them. It will not work with existing coupler bodies. The following illustrations (FIGS. 6-11) represent one example of how the CDF might function.

Figure 5A:
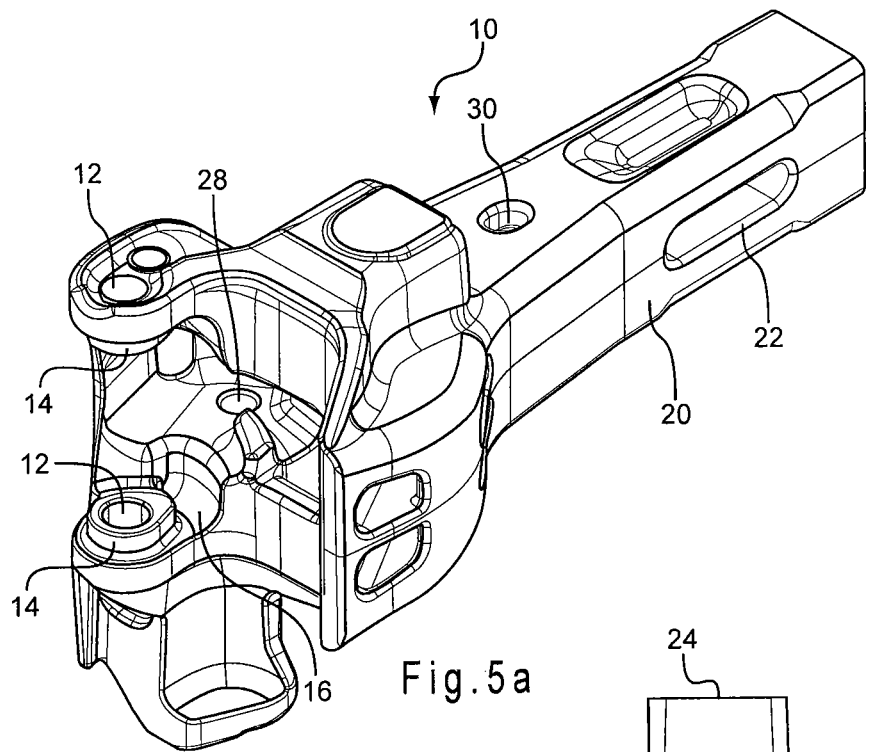
FIG. 5a is a perspective view of coupler of FIG. 1.
Figure 5B:
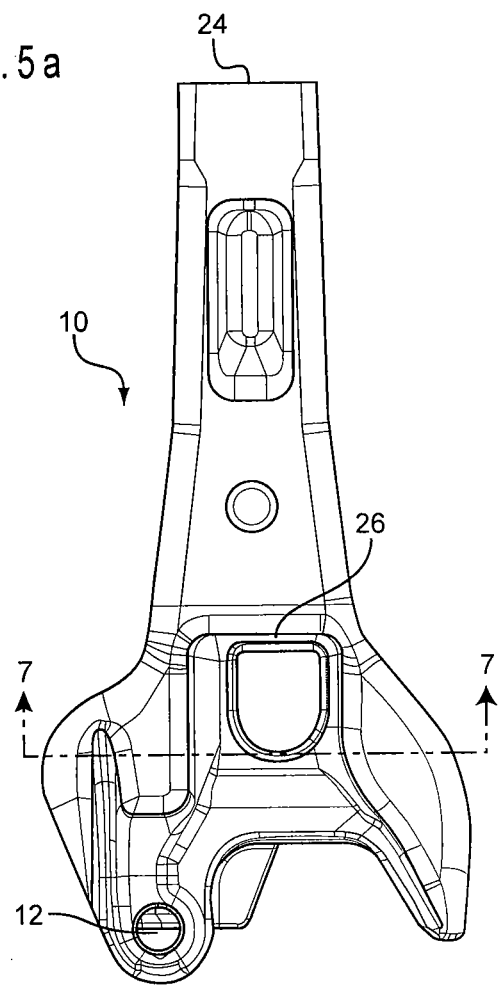
FIG. 5b is a is a top plan view of the coupler of FIG. 1.
Figure 6:
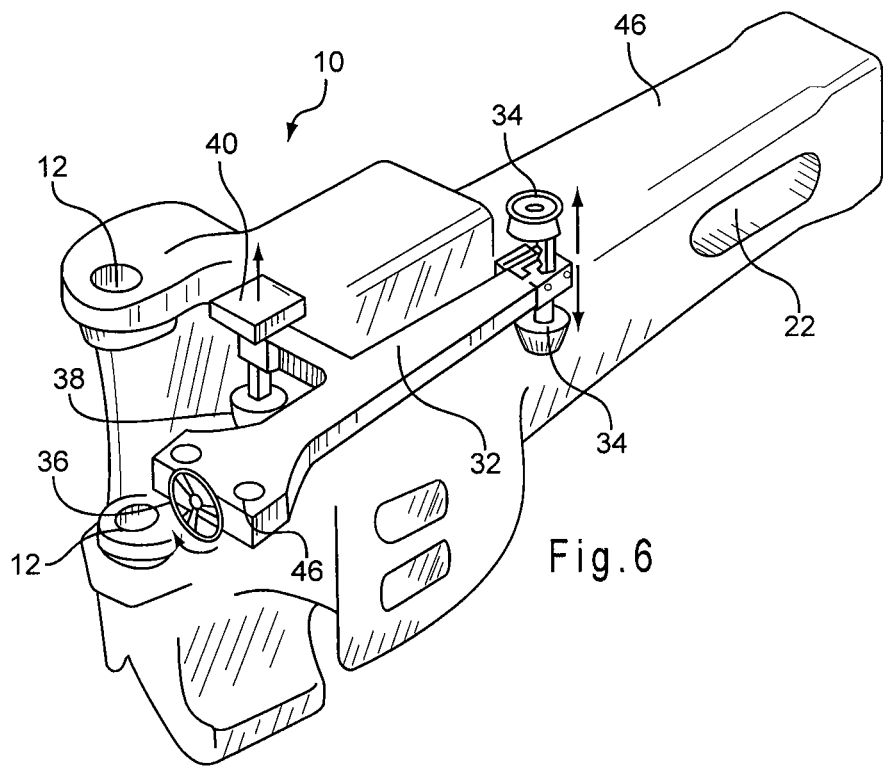
FIG. 6 is a perspective view of a coupler with the wall broken away and having a gauge attached.
Figure 7:
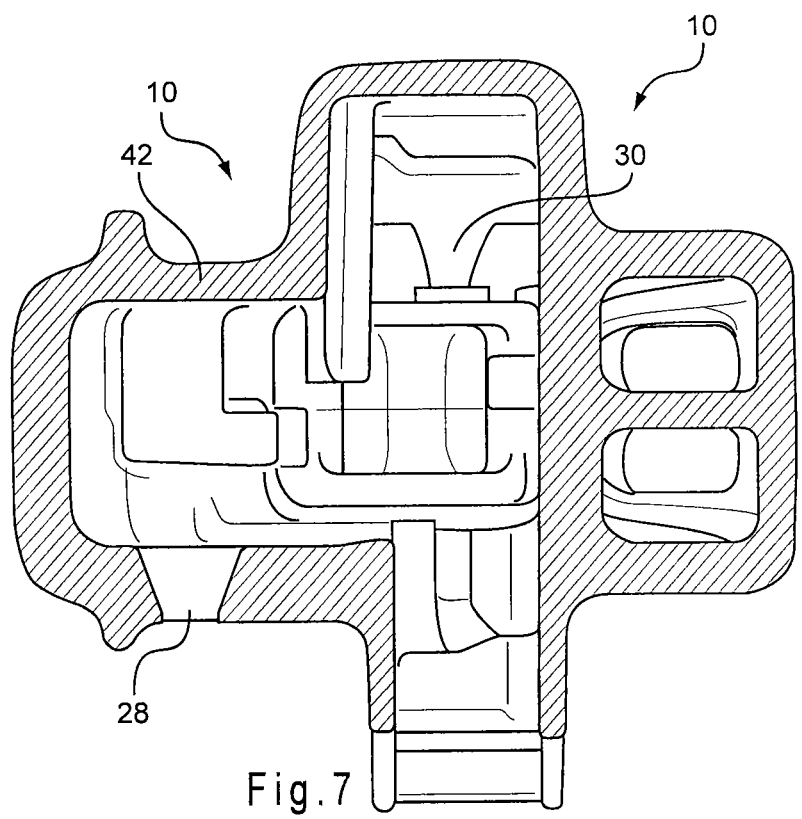
FIG. 7 is a cross sectional view along line 7-7 of FIG. 5b.
Figure 8:
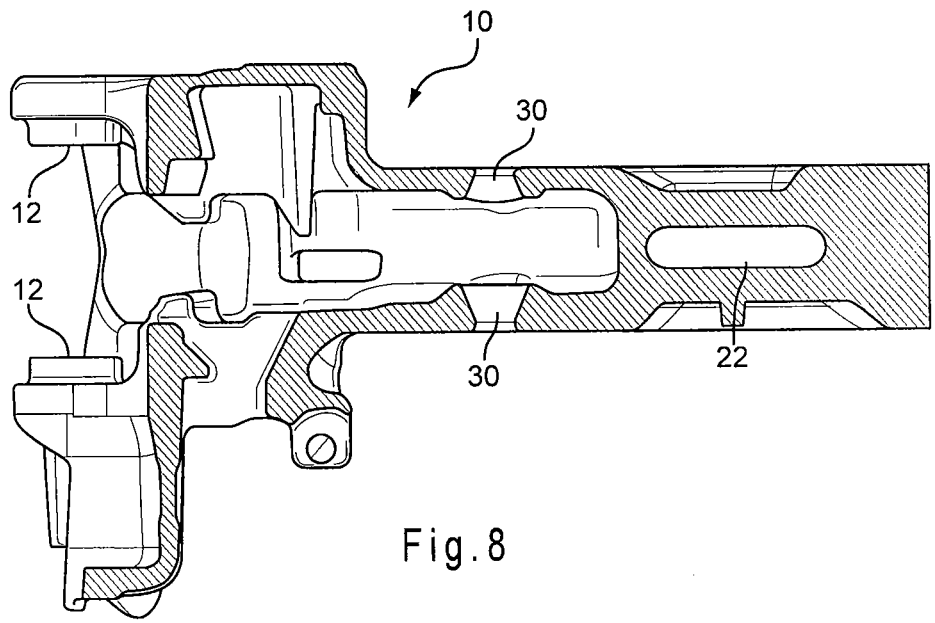
FIG. 8 is a cross sectional view of the coupler of FIG. 6.
Figure 9:
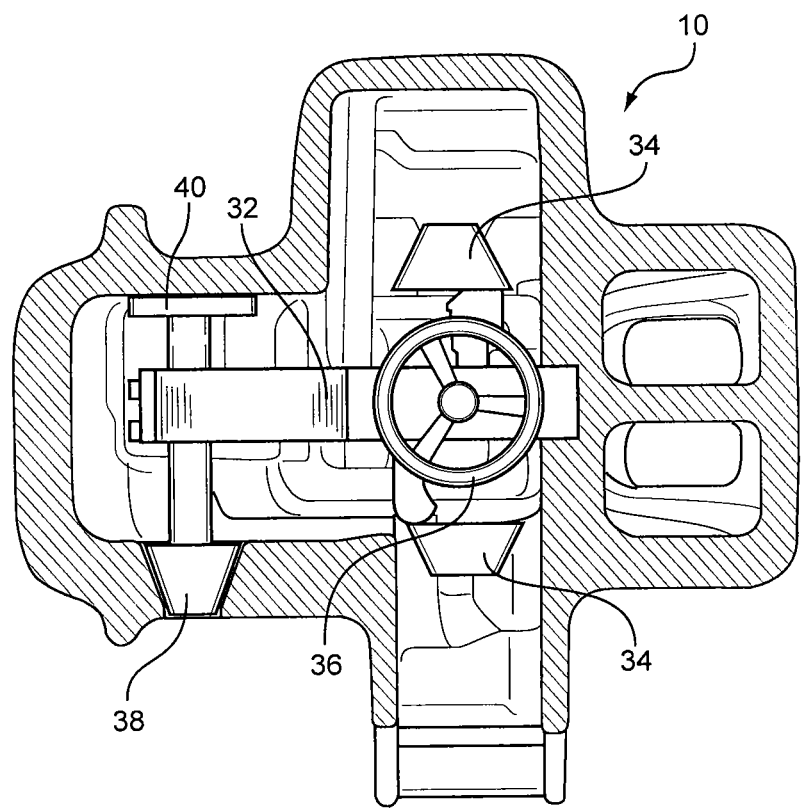
FIG. 9 is a cross sectional view along line 7-7 of FIG. 5 and showing the gauge of FIG. 6.
Figure 10:
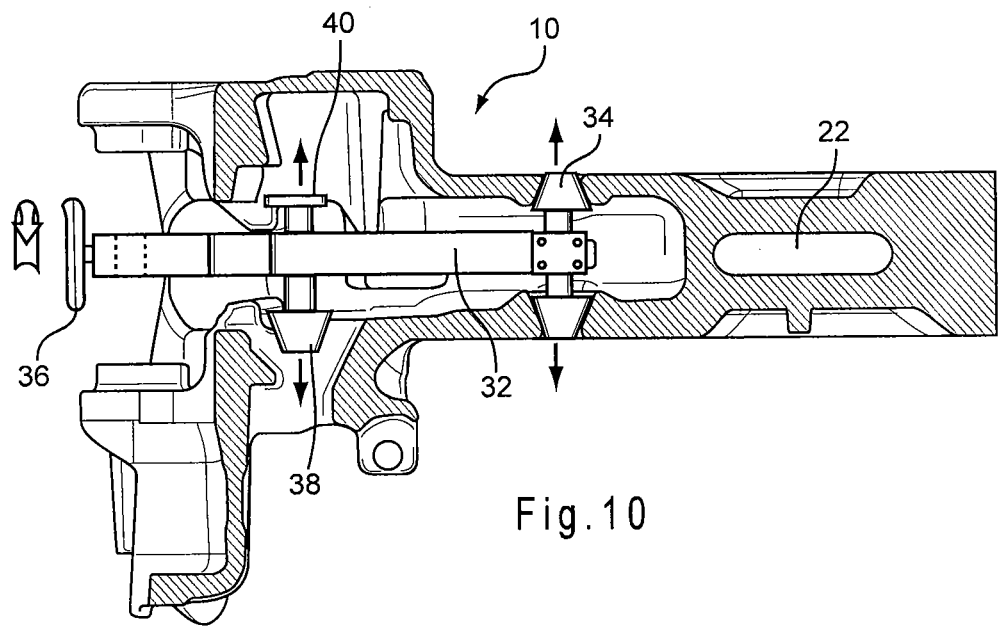
FIG. 10 is a cross sectional view of the coupler of FIG. 8 with the gauge of FIG. 6 attached.

Referring to FIGS. 5, 7 and 8, an embodiment of added CDFs is illustrated on a coupler 10. The CDFs in this embodiment comprise a drain hole 28 which can have exaggerated draft located in the lower half of the coupler 10. The drain hole dimensions are typically set at the same time as the lugs 18 and buffing shoulders 16, which provide good dimensional accuracy. The second CDF in this embodiment comprises one or more core support holes 30 defined on the shank of the coupler 10. These core support holes can 30 have exaggerated draft and again may be set by the same core that sets the pulling lugs 18 and buffing shoulders 16, thereby also providing good dimensional accuracy. Neither of these CDFs are located in positions on the coupler 10 that wear over time. Therefore, they can be used in conjunction with a corresponding gauge 32 as illustrated in FIGS. 6, 9 and 10.

In use, the gauge 32 locks 3 axes of direction into place with the cast-in body features of the coupler body 10. Conical telescoping clamps 34 are forced into the core support holes 30 from the inside via a hand-operated crank 36 located at the end of the gauge 32. Another conical feature 38 is located in the opening for the drain support hole 30 which prevents the gauge 32 from rotating about the Y axis. A telescoping stop 40 also aides in stabilizing the gauge 32 against a non-wearing surface 42 on the inside surface of the coupler head.

Figure 11:
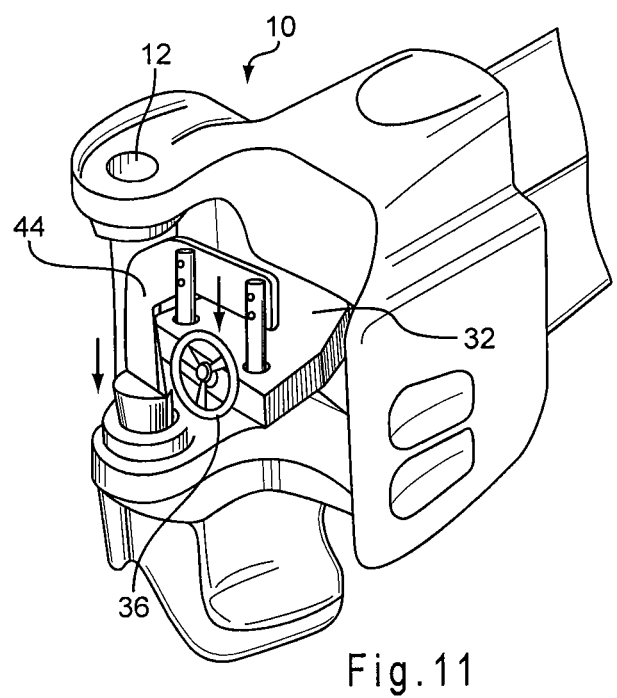
FIG. 11 shows a finishing attachment attached to the gauge of FIG. 6.

As shown in FIG. 11, once the gauge 32 is properly positioned, the finishing attachment 44 keys into the front end of the gauge. This finishing attachment 44 acts as a welding and grinding template for shape and relative location of the C10 pin slot 12 interior surfaces. The two rods of the finishing attachment 44 slip fit into precision drilled holes 46 on the gauge 32 and allow the finishing attachment 44 to securely slide up and down along the specified axis of motion. The finishing attachment 44 can be flipped vertically to check the upper C10 pin slot 12 as well. A refinisher checks the C10 pin slots 12 for gaps, welds and grinds, then replaces the finishing gauge attachment 44 to recheck. A feeler gauge as known in the art can be used in conjunction with the template plug as a final check of accuracy. This method of attachment could also be used for additional finishing attachments, such as an attachment 80 for checking pin protector contours.

Figure 12:
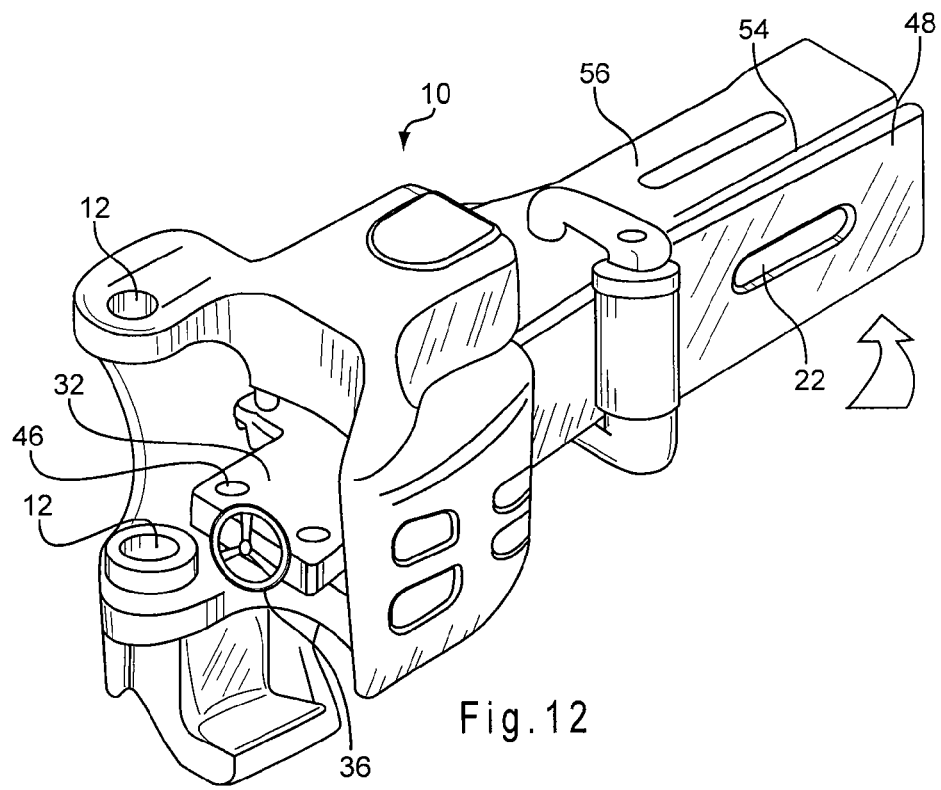
FIG. 12 shows an alternative gauge attached to the shank of a coupler.
Figure 13:
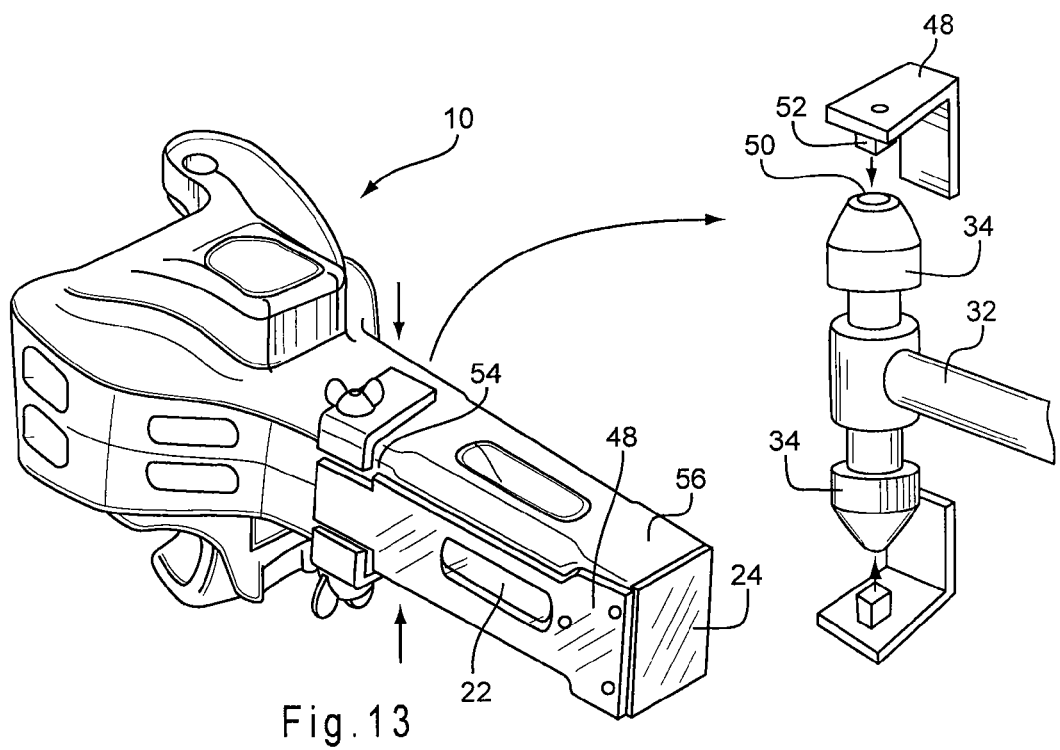
FIG. 13 shows the gauge of FIG. 12 as well as the internal construction of the gauge of FIG. 6.

Another embodiment of a finishing attachment 48 locks into keyed openings 50 in the conical telescoping clamps 34 on the gauge 32 as shown in FIGS. 12 and 13. The attachment 48 includes protrusions 52 that match the keyed openings 50 in the telescoping clamps 34. This attachment 48 swings into place along the side 54 of the coupler shank 56 to act as a template for checking the size, shape, and relative location of the key slot 22 and shank butt 24. A refinisher checks the key slot 22 and shank butt 24 against the gauge, welds and grinds, then replaces the finishing attachment 48 to recheck. A feeler gauge or straight edge can be used in conjunction with the finishing attachment 48 as a final check of accuracy.

In addition to reconditioning coupler bodies that are manufactured with an additional CDF, it is desirable to recondition coupler bodies that are currently manufactured and are in service without a pre-established reference point. This represents a different set of challenges, as different manufacturers use proprietary dimensions, tolerances, and/or manufacturing methods, that are developed independently from one another for non-AAR specified features. The goal is to establish a central datum reference point based on contact points or CDF "features" to measure or gauge from. This requires a CDF gauge to utilize dimensions that the AAR has determined all manufacturers must abide by to provide standardization to ensure interchangeability of all manufacturers' components in the field.

Figure 14A:
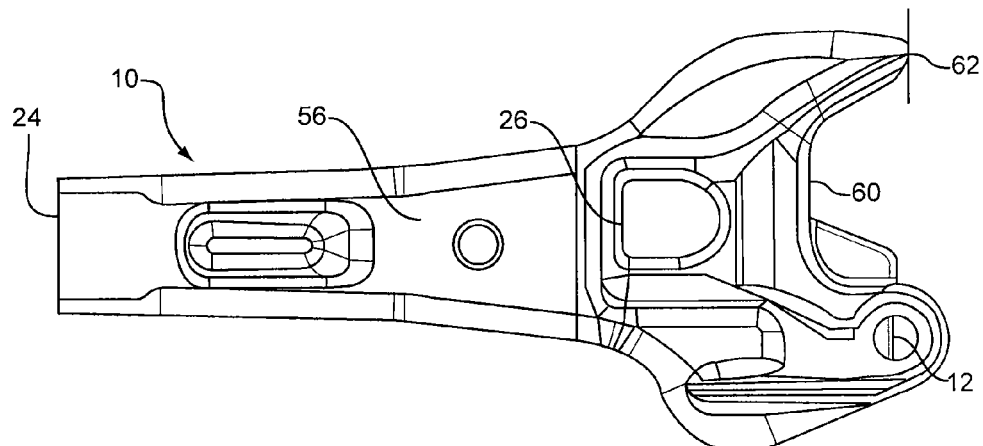
FIG. 14a is a top plan view of a coupler.
Figure 14B:
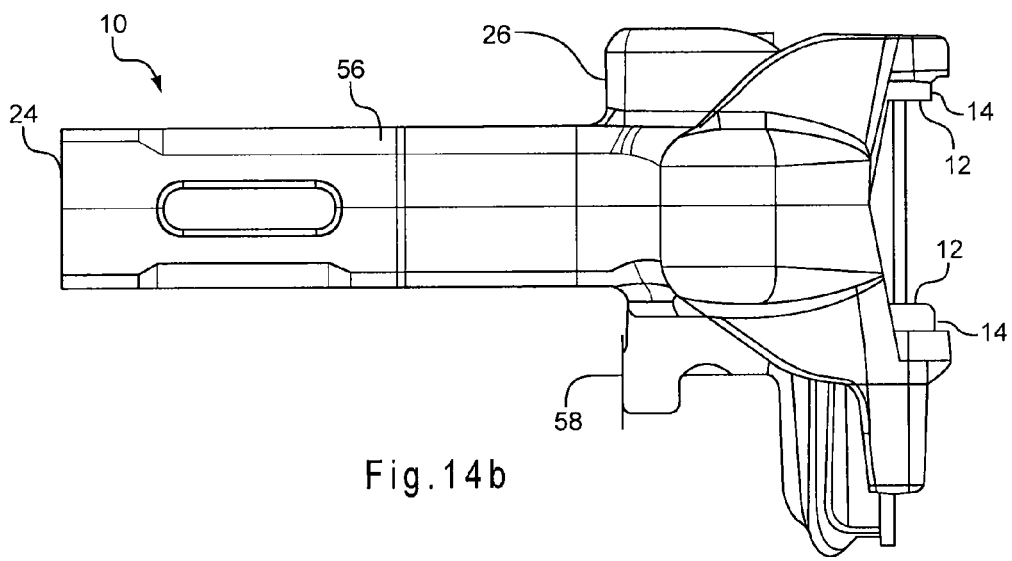
Figure 15A:
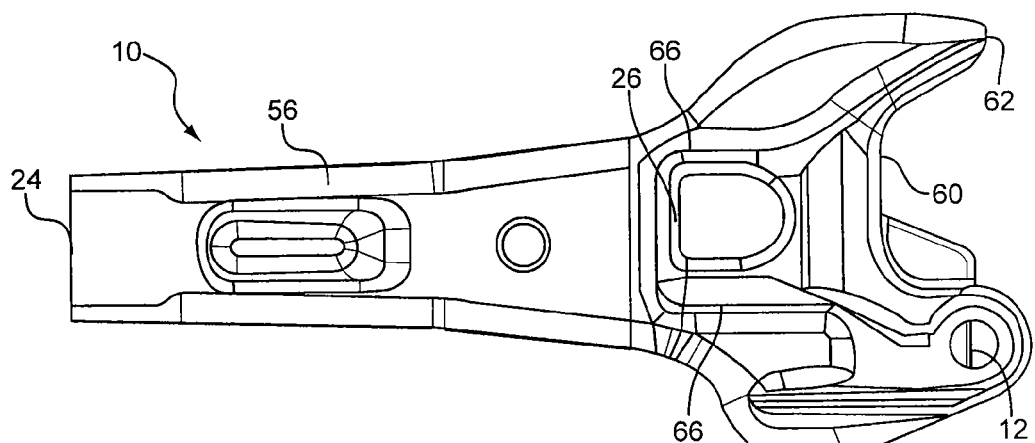
FIG. 15a is a top plan view of a coupler.
Figure 15B:
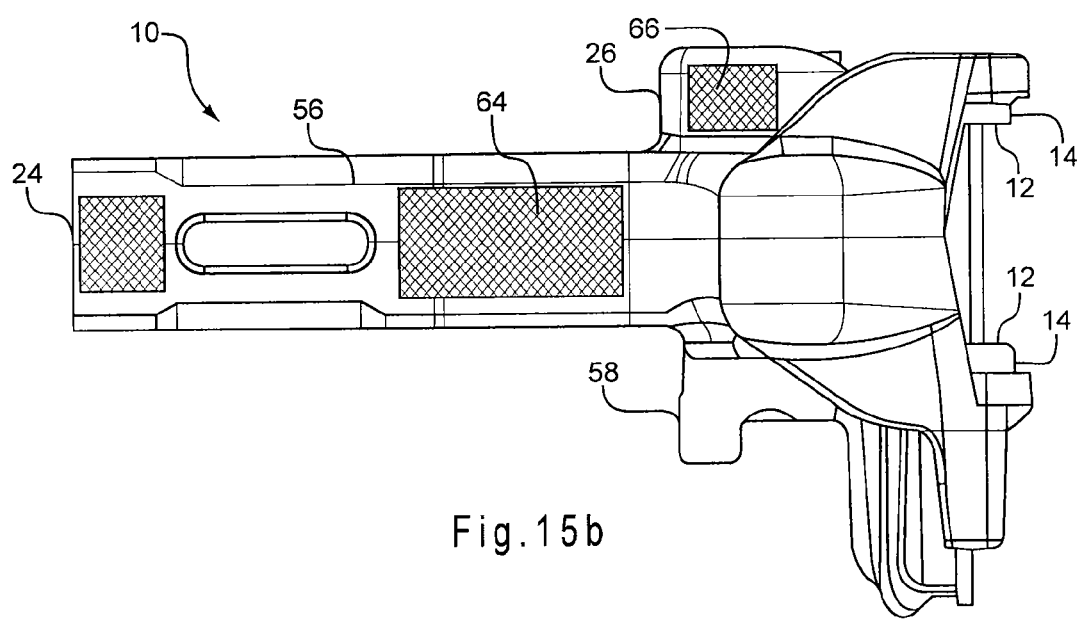
Figure 16A:
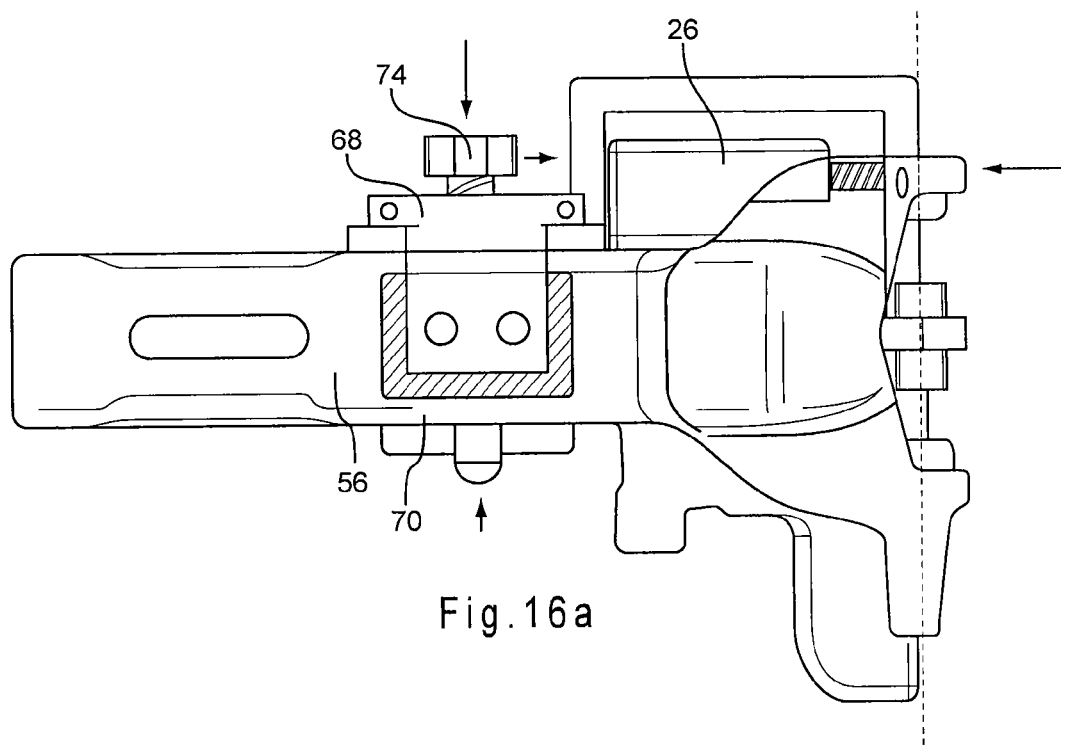
Figure 16B:
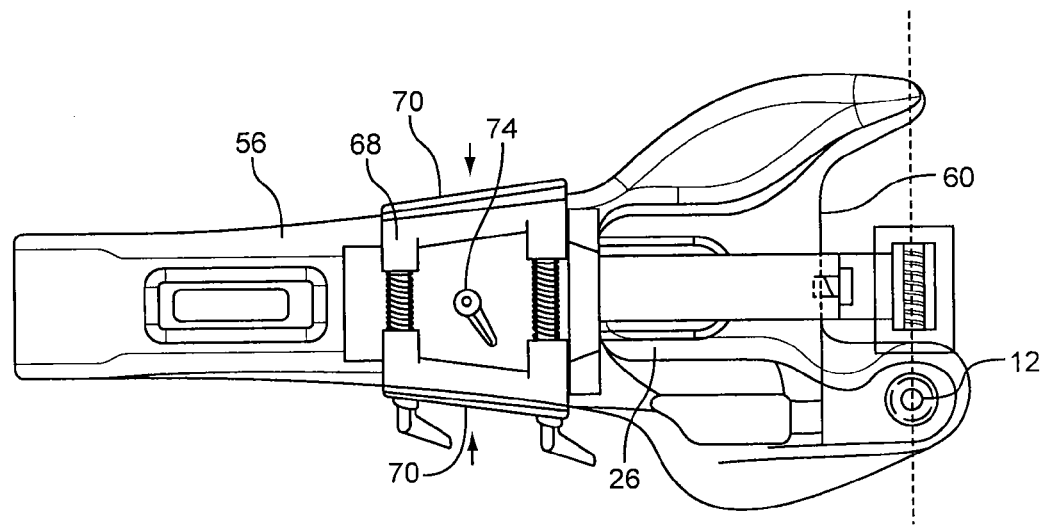
Figure 17:
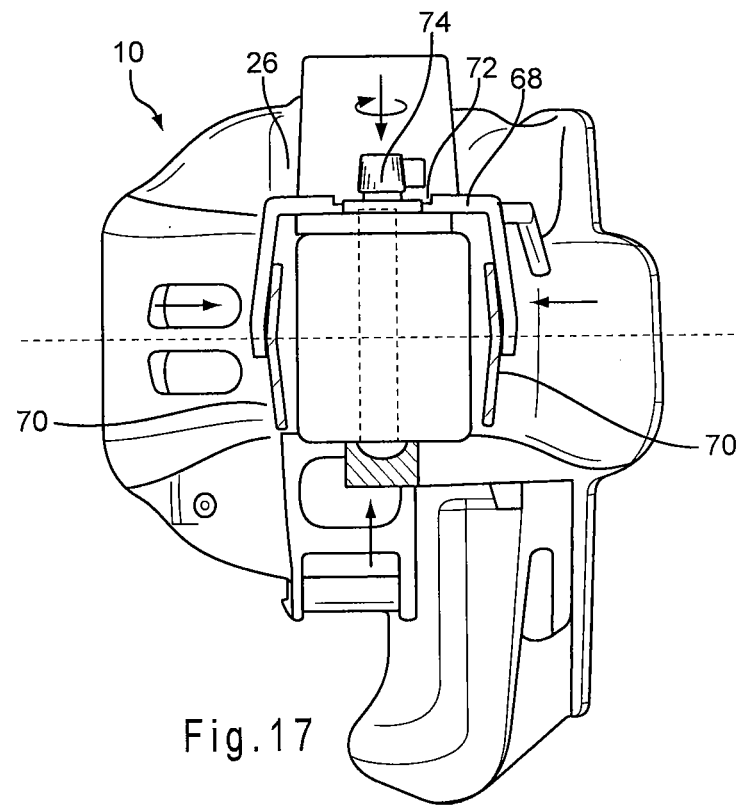
Figure 18:
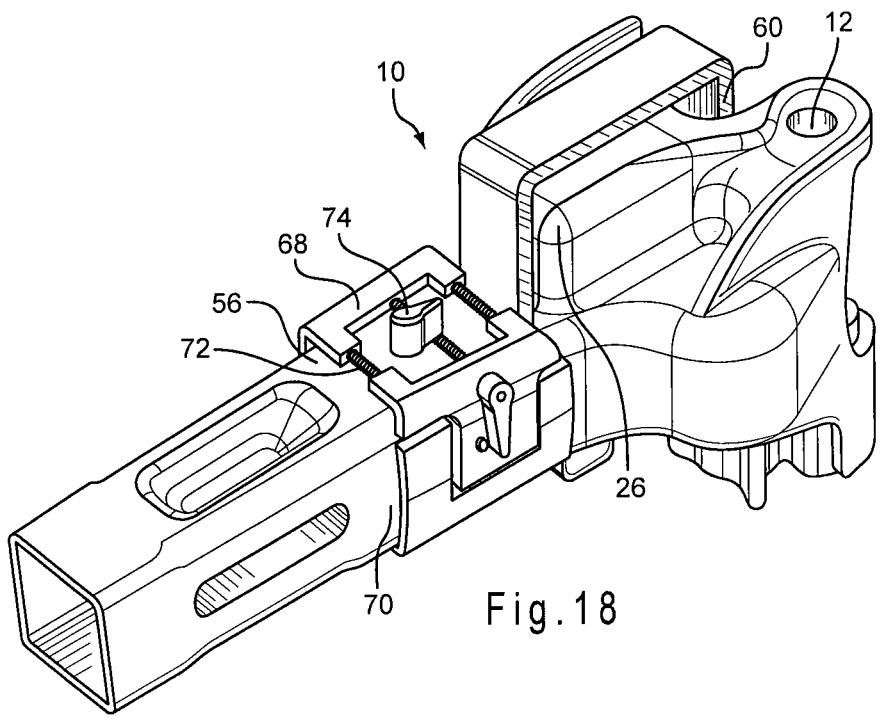
Figure 19:
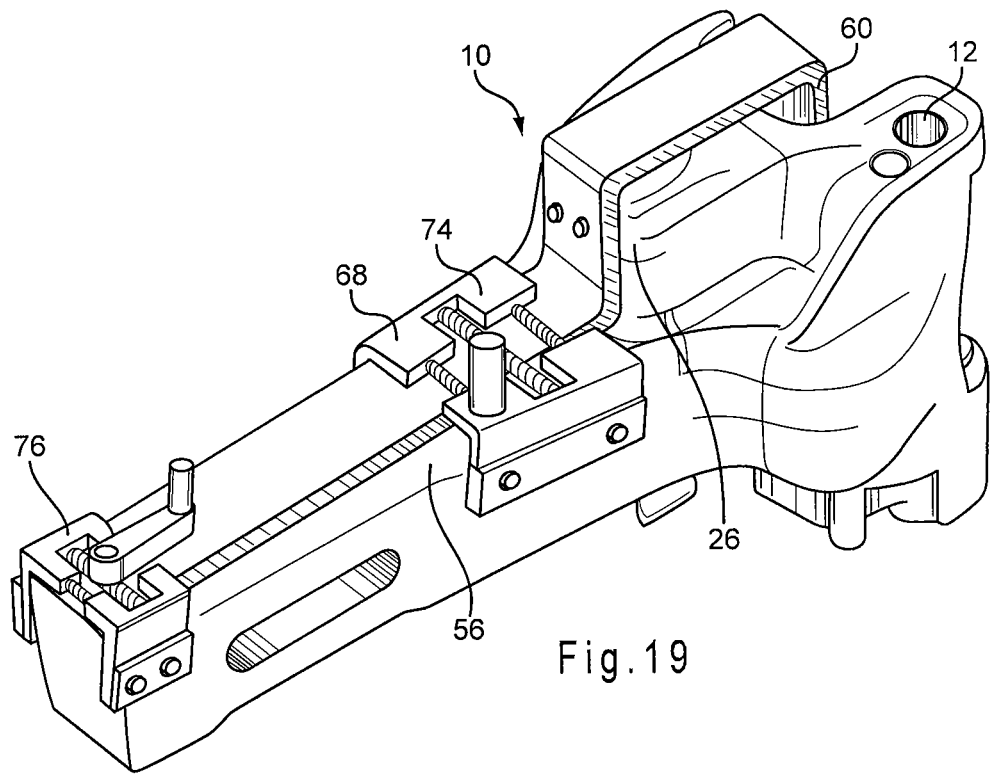
Figure 20:
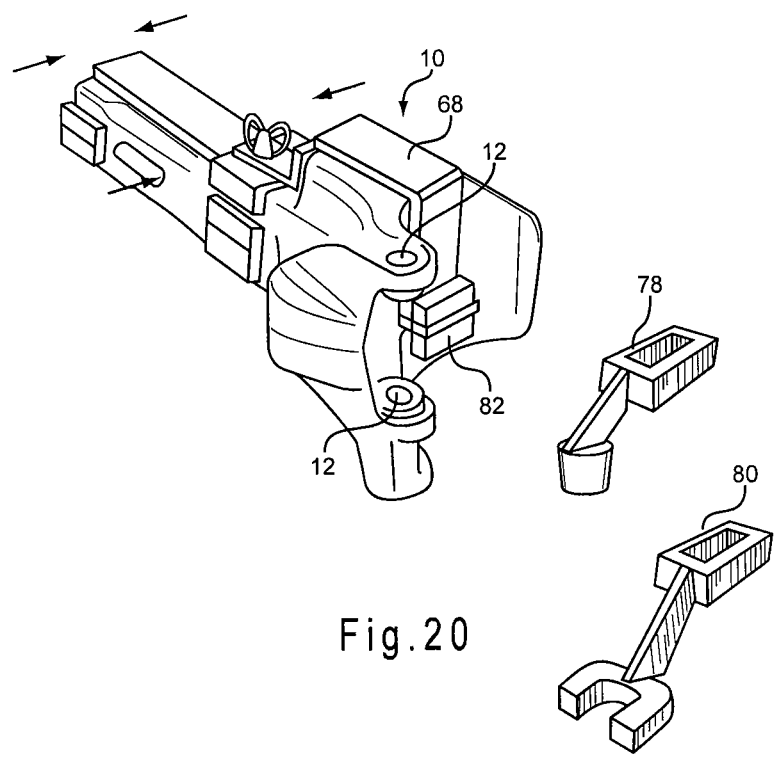
FIG. 20 is a perspective view of the coupler and gauge of FIG. 16a and multiple finishing attachments.
Figure 21:
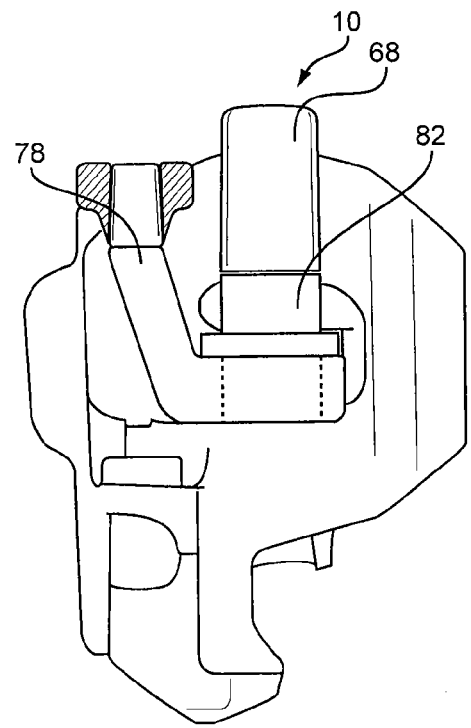
Figure 22:
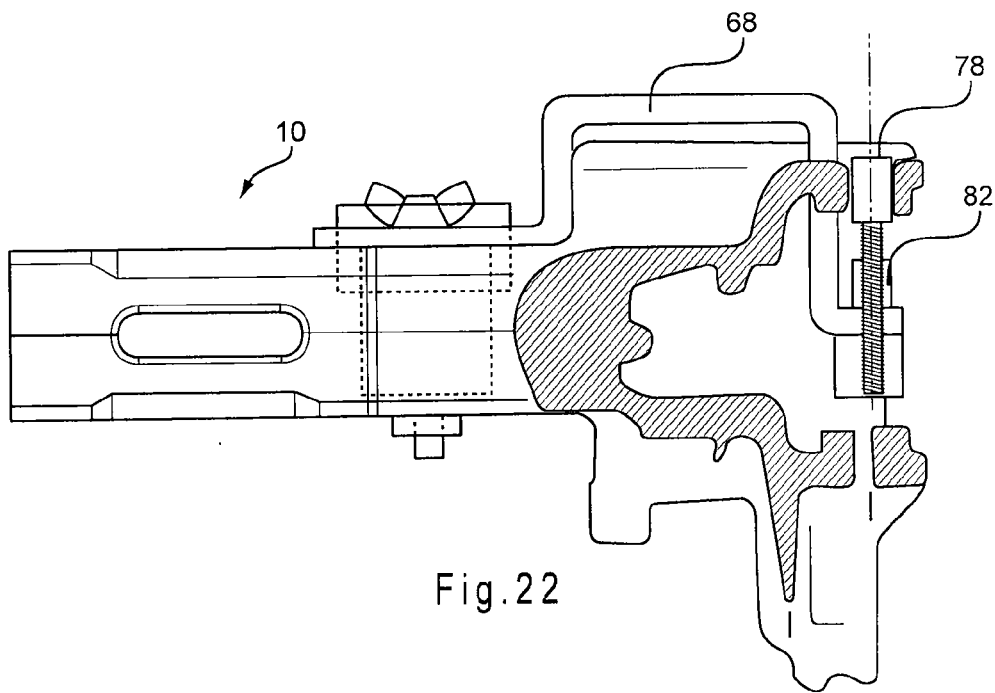
FIG. 22 is a side view of FIG. 21.
Figure 23:
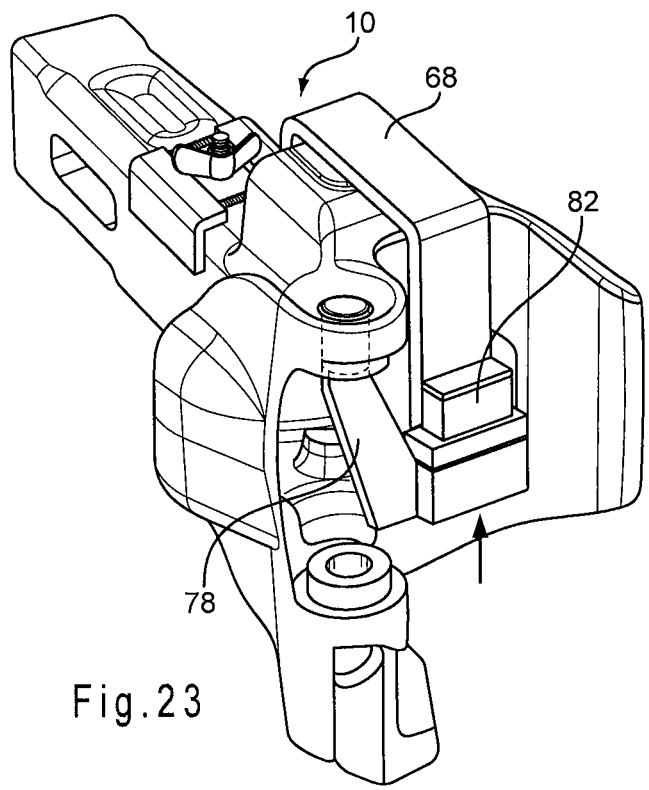

FIGS. 14 and 15 illustrate features of a standard coupler 10 that typically wear such as the butt end 24, the bottom of the shank, the C10 slot 12, the pin protectors 14, the pulling lugs 28, the front face 60, and the front guard arm 62. In order to reestablish critical wear features on couplers from any manufacturer, the CDF gauging system must lock onto the coupler's X, Y and Z axes of motion. Some coupler body 10 features are standard and are common among manufacturers, but other features are not.

FIGS. 16-19 illustrate how an embodiment of a gauge 68 of the present invention would preferably attach to a standard coupler 10. The gauge 68 squeezes symmetrically onto the sides 70 of the coupler shank 56 to establish the center line of the coupler along the longitudinal plane. Another portion of the gauge 68 sits on the top surface of the coupler shank 56. This does not lock the gauge 68 along the vertical axis, but it does establish the gauge 68 parallel to the top 72 of the shank 56, ensuring the pin holes 12 will not be tilted relative to this plane. A threaded rod 74 may be used to clamp the gauge 68 down onto the top surface 72 of the shank 56. Another section of the gauge 68 is seated on the back of the horn 26 to lock it into place along the Z axis. This seating can be ensured by clamping onto the front face 60.

The gauge 68 may also include a secondary clamping mechanism 76 that clamps to the sides 70 and the top plane 72 of the shank 56 near the butt end 24. This secondary clamp 76 further stabilizes the gauge 68 and operates in the same fashion as the clamp previously described.

Once the gauge 68 is clamped to the sides 70 of the shank 56, clamped to the top plane 72 of the shank 56, and sealed against the back of the horn 26, the coupler 10 can be refinished using attachments 78, 80 that slide on and off of a protrusion 82 on the gauge 68 as the finisher welds, grinds, and checks his/her work as illustrated in FIGS. 20-24. These attachments 78, 80 are symmetrical, so they can simply be flipped upside down to check the top or bottom C10 pin slot 12 or pin protector boss 14 contour. The finisher would place the attachment 78, 80 to see where and how much the features needed to be welded, remove the attachments 78, 80 to weld, and then grind smooth to the desired contour. The features can then be rechecked with the attachment 78, 80 until they fit to a prescribed tolerance. A feeler gauge can be used in conjunction with the finishing attachments 78, 80 as a final check of accuracy.

Figure 25:
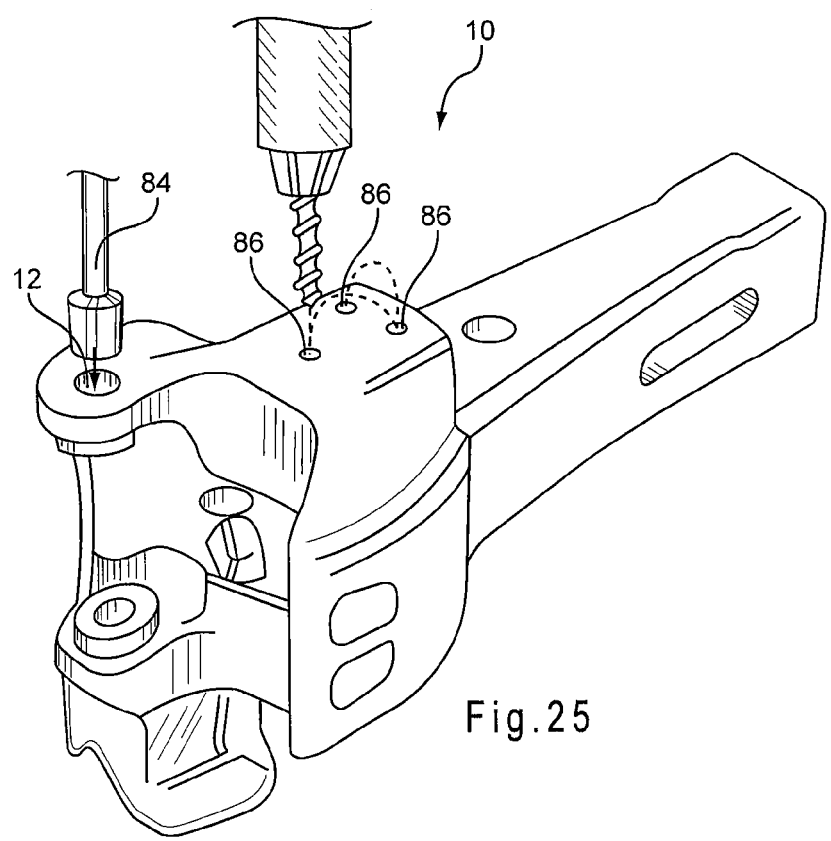
FIG. 25 shows a probing tool and a drill utilized for drilling CDFs into a coupler.

An alternative concept for casting in CDFs during production is to machine in features after casting. FIG. 25 illustrates the utilization of a probing tool 84, such as found on a coordinate measuring machine (CMM) to locate the interior surface of the C10 pin slots 12 and/or other key features on the coupler body 10 to establish a datum point from the physical surface. Using this datum as a common or primary reference point, or center line, one or more countersink divots 86 are drilled at a non-wearing location on the body 10. The features drilled into the body would then be used as secondary reference points to locate a gauging system for reconditioning the body throughout its life cycle. Adding these features after casting adds an extra level of precision compared to measuring from cast in features as they do not have the typical tolerance buildup associated with the casting process. It also sets up a datum relative to the physical cast feature, rather than a theoretical nominal dimension that could float within a tolerance range. This concept is applicable to new coupler bodies from any manufacturer. Furthermore, it could be used on already existing couplers in the field.

Figure 26:
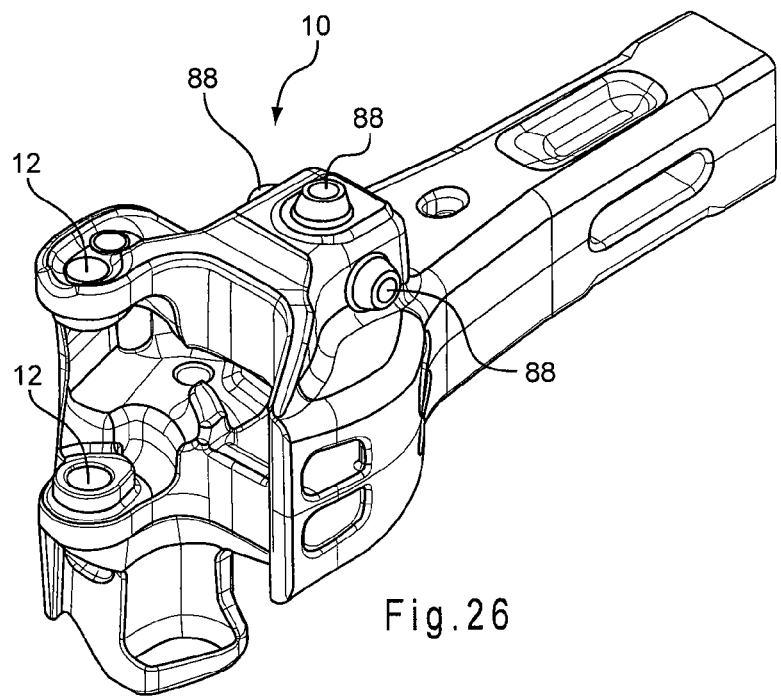
FIG. 26 is a perspective view of a coupler with cast on CDFs.
Figure 27:
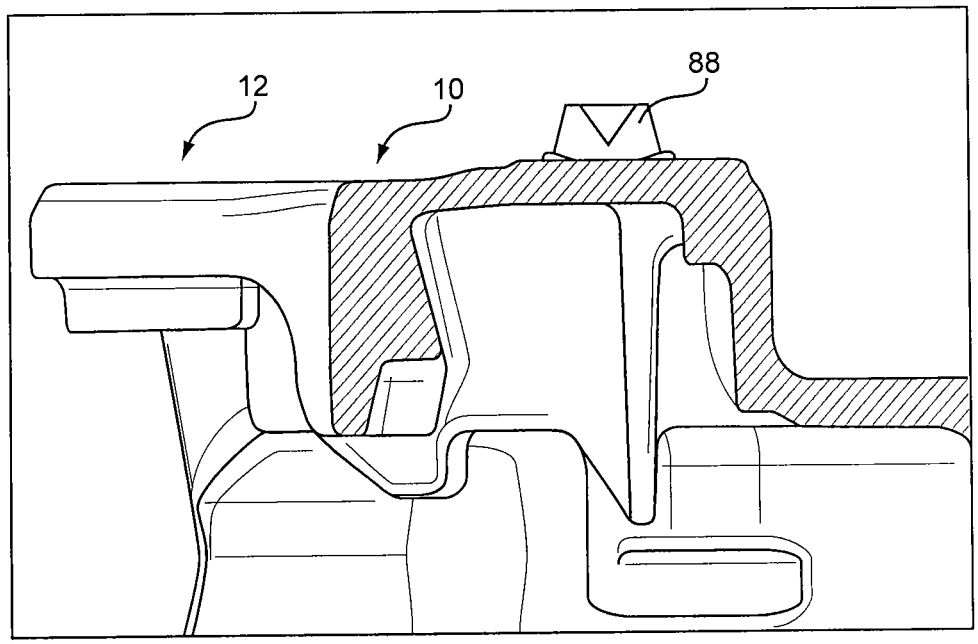
FIG. 27 is a close up view of the CDFs of FIG. 26.
Figure 28:
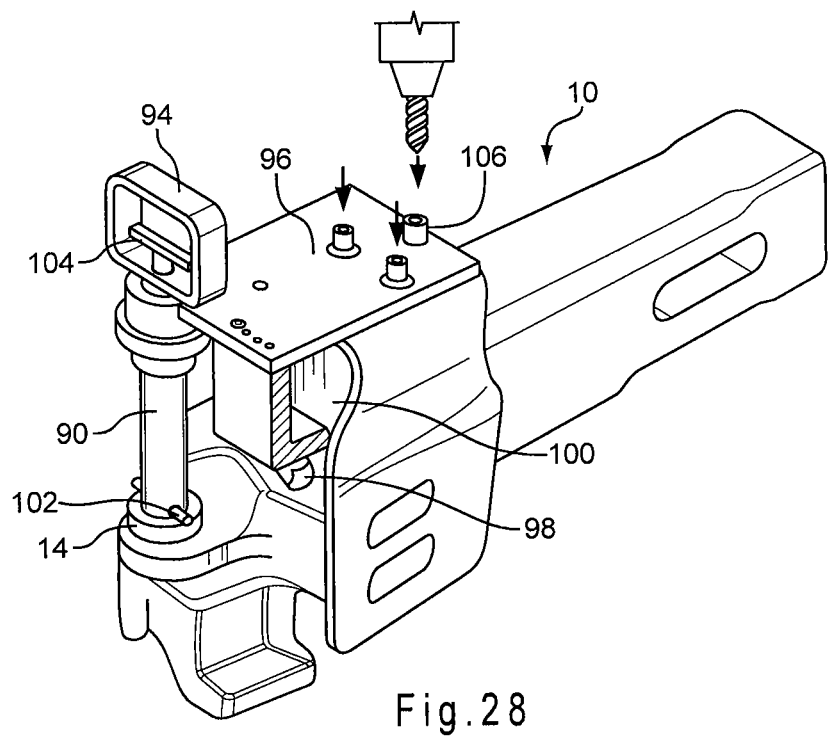
FIG. 28 is a perspective view of a pin gauge used in conjunction with a drill.
Figure 29:
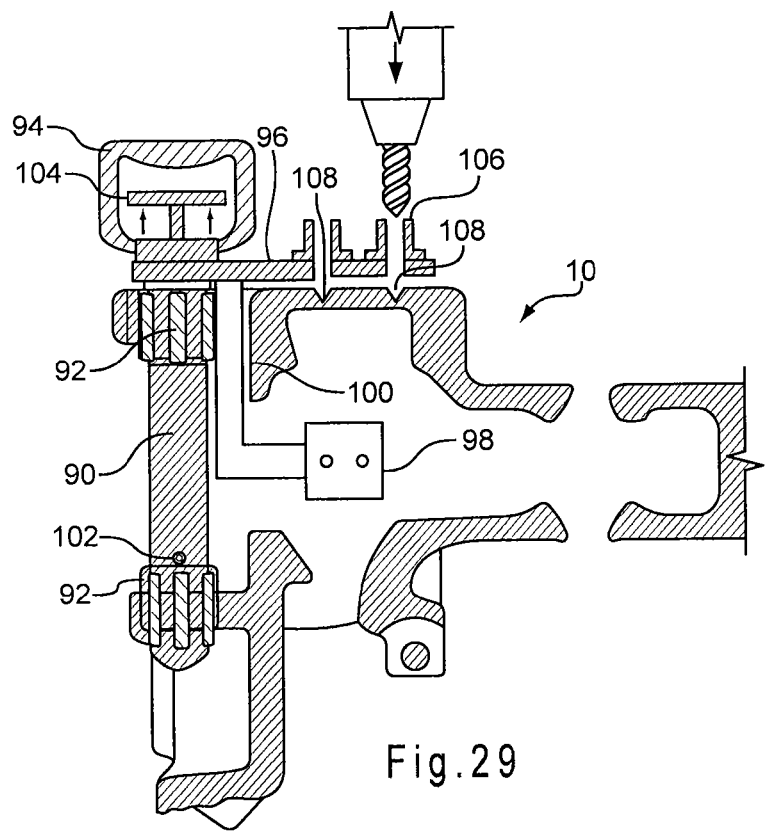
FIG. 29 is a cross-sectional side view of FIG. 28.
Figure 30:
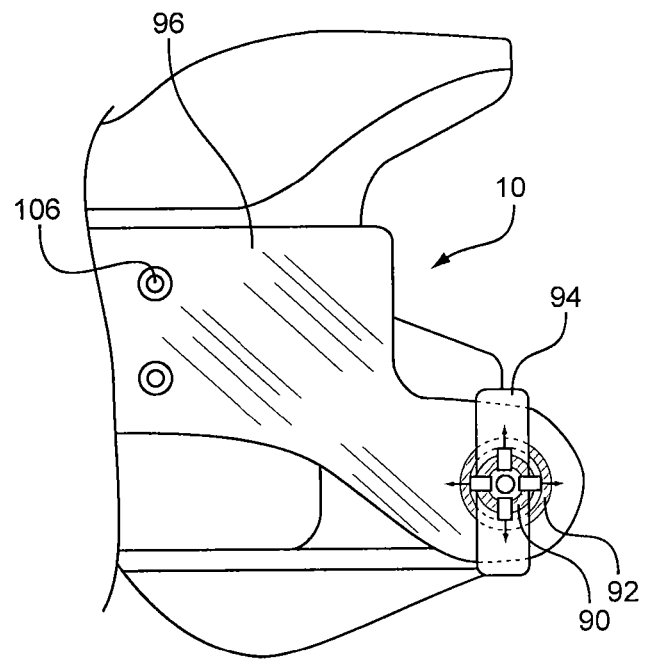
FIG. 30 is a close up top plan view of the pin gauge of FIG. 28.
Figure 31:
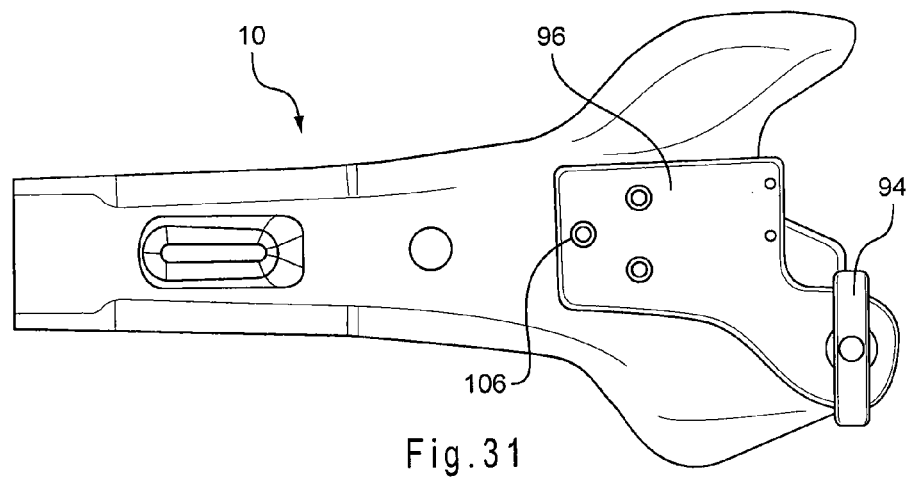
FIG. 31 is a top plan view of a coupler and an attached alternative gauge.

Referring to FIGS. 26 and 27, an alternative embodiment for casting in CDFs during production is to permanently attach separate precision machine components 88 by means such as welding to non-wearing surfaces of the body 10 after casting. A probing tool such as that found on a coordinate measuring machine (CMM) would locate the interior surface of the C10 pin slots 12 and/or other key features on the coupler body 10 to establish a datum point from the actual manufactured surface. Using this datum as a home, one or more locating-feature components 88 are welded onto the body of a location that could be prescribed by computer numerical control (CNC). The contact point of the welded on datum features 88 would be shaped in such a way that it would not be affected by the uneven cast surface of the cast body, such as a dome or point. The datum feature 88 would then be welded while it is held securely at its proper location. The features 88 welded onto the body 10 are then be used as reference points to locate a gauging system such as those described previously for reconditioning the body 10 throughout its life cycle. Adding these features 88 after casting adds an extra level of precision compared to using cast in features as they do not have the typical tolerance buildup associated with the casting process. The features 88 would also set up a datum relative to the physical cast feature, rather than a theoretical nominal dimension that could float within a tolerance range. This concept is applicable to new coupler bodies from any manufacturer.

Referring to FIGS. 28-31, an alternative embodiment of locating post-casting CDFs with a coordinate measuring machine or other CNC machine is shown. This method is performed mechanically. This embodiment utilizes a gauge 96 with a pin 90 that is centered in the upper and lower C10 pin slot 12 using centering features 92 located within that pin 90. As a handle 94 is used to place the gauge 96 in the C10 pin slots 12, an attached clocking arm 98 locates against the inner lock wall 100 or other functional surface to prevent the gauge 96 from rotating, while a dowel pin 102 is added to locate the height of the device off of the top surface of the lower pin protector boss 14. A secondary handle 104 is then released to locate the pin 90 in the center of the C10 pin slot 12. The spring loaded centering features 98 apply equal force in four directions, coordinating the nominal center of the device with the physical center of upper and lower C10 pin slots 12. Drill guides 106 are used to drill datum features 108 at specific non-wearing locations on the coupler body 10. These features 108 are then used for locating CDF gauging system after the coupler body 10 has been in service and is qualified for reconditioning.

Figure 24:
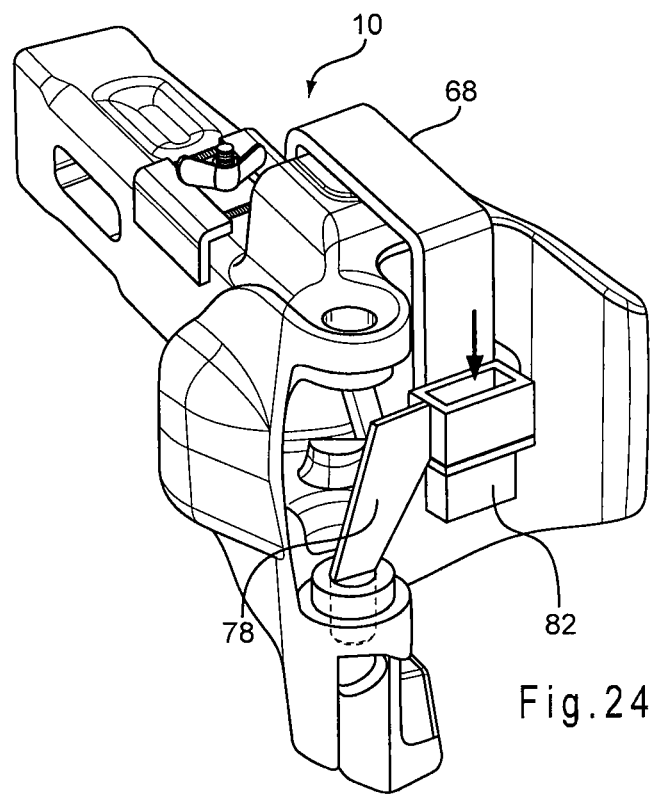
FIG. 24 is a perspective view of the finishing attachment of FIG. 22 in a reversed position.
Figure 32:
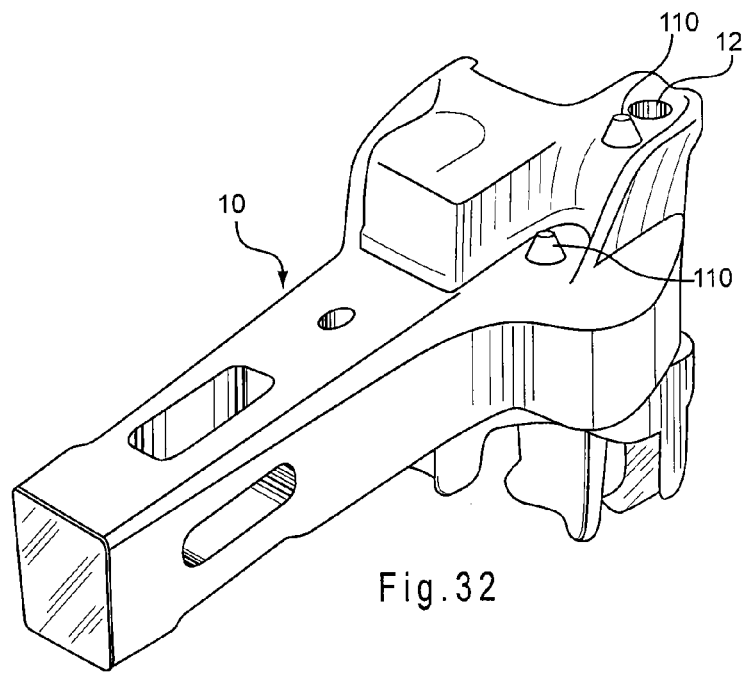
FIG. 32 is a perspective view of a coupler with CDFs.
Figure 33:
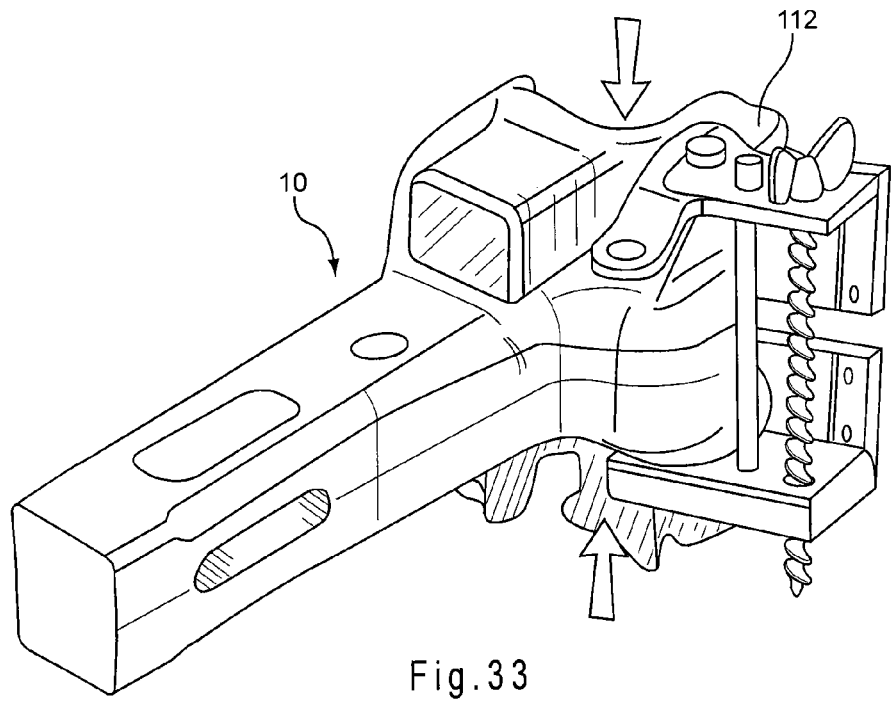
FIG. 33 is a perspective view of the coupler of FIG. 32 with a gauge attached.
Figure 34:
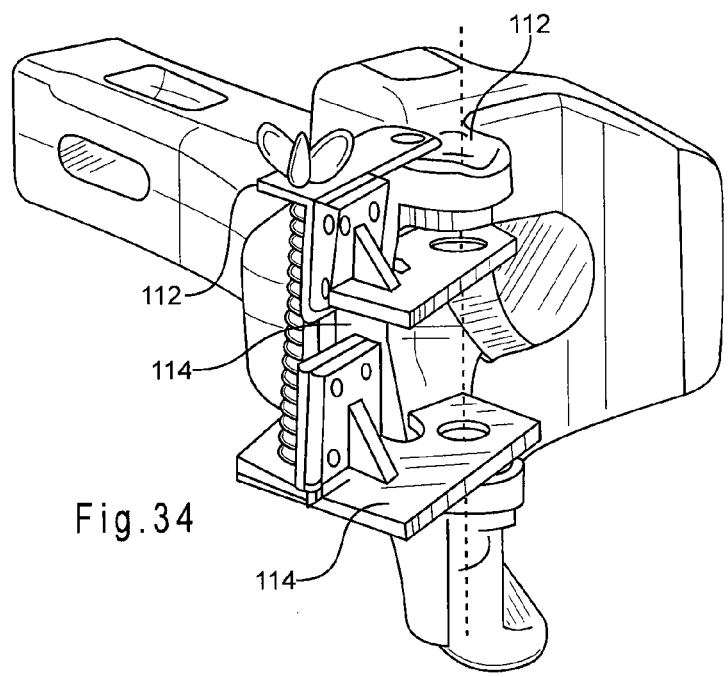
FIG. 34 is a perspective view of FIG. 33 with finishing attachments in place on the gauge.

As illustrated in FIGS. 32-24, another method for adding CDFs to the coupler body 10 is to add cast features 110 that are precision ground in a secondary application. The features 110 are oversized and located at defined locations on the body 10. The features 110 are then ground into a prescribed shape, the relative position of which is determined by key as-cast features, and could be located mechanically or with a CMM. The secondary machining operation will allow the CDFs to be held at a tighter machining tolerance than standard costing tolerance, while the material for the CDF would already be present from the manufacturing process. A gauging device 112 is then clamped onto the CDFs 110 and indicates where key wearing features need to be restored. Different finishing attachments 114 are used with the gauging device 112 to reestablish all the key wearing features of the coupler body 10.

An alternative to reconstructing the pulling lugs 18, which are the most inaccessible primary wearing features of the coupler body 10, is to recondition the rest of the primary wearing features relative to the worn surface of the pulling lugs 18 as long as they are still within an acceptable tolerance range as determined by industry standards.

Figure 35:
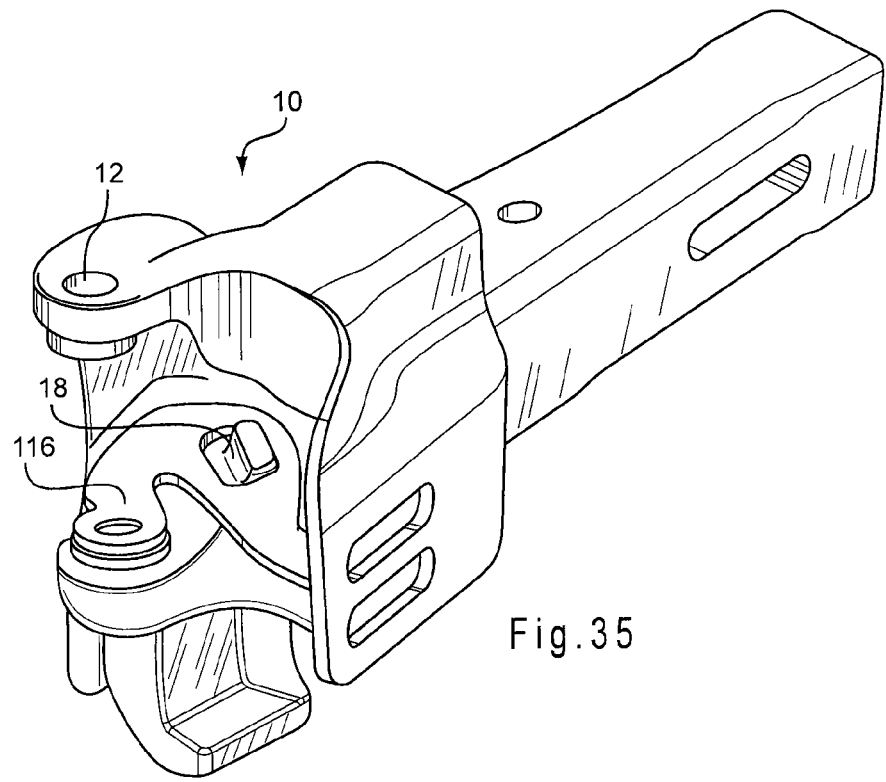
FIG. 35 is a perspective view of an alternative gauge on a coupler.
Figure 36:
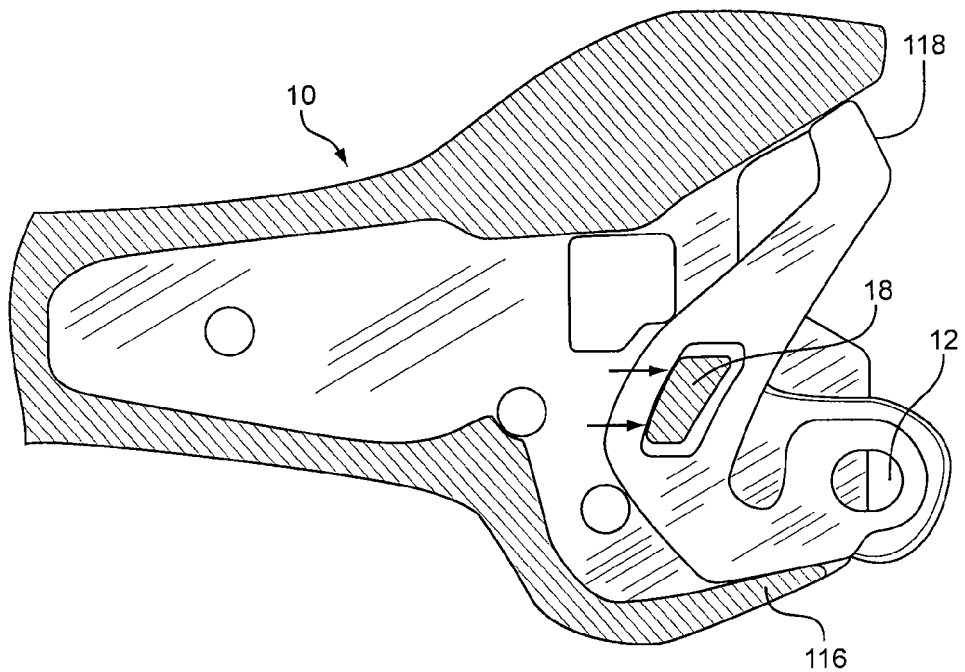
FIG. 36 is a top plan cutaway view of FIG. 35.

As shown in FIGS. 35 and 36, after determining that the pulling lugs 18 qualify for reconditioning, a reconditioning gauge 116 is placed in the mouth of the coupler body 10. The gauge 116 is located off of the load face of the top (or bottom) pulling lug 18. The gauge 116 then acts as a template for the refinisher who checks the C10 slot 12, pin protector boss contour 14, and buffing shoulder 16 contour. The coupler body 10 can then be welded and ground, and the gauge 116 used to recheck for proper dimensions. The arm 118 of the gauge 116 helps to hold these key wearing features relative to the rest of the head of the coupler's 10 geometry. A feeler gauge or straight edge can be used in conjunction with the reconditioning gauge 116 as a final check of accuracy. This process is then repeated for the bottom (or top) set of primary wearing features.

Figure 37:
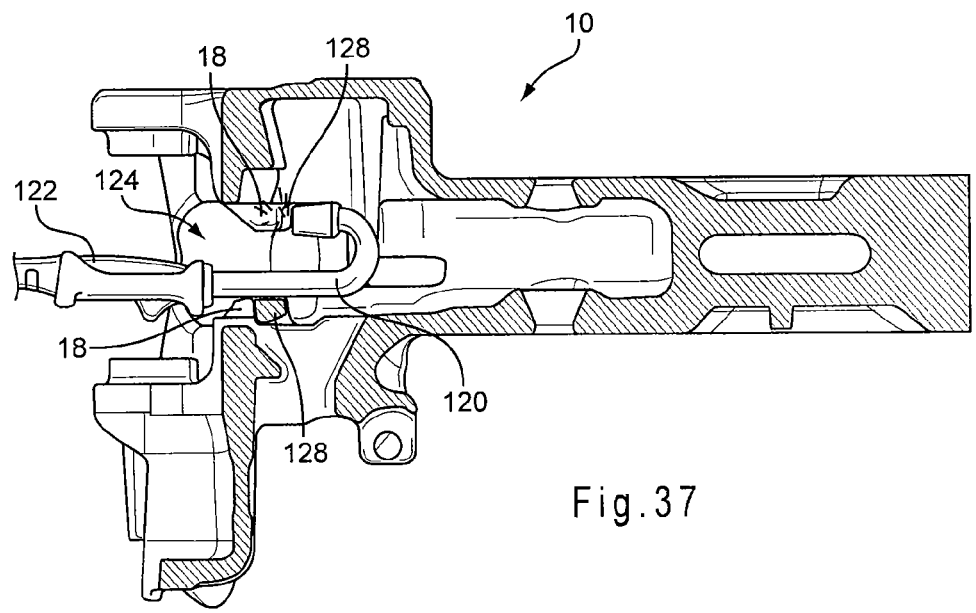
FIG. 37 is a cross-sectional view of a coupler and a MIG welder with a specialized handle entering through the lock chamber.
Figure 38:
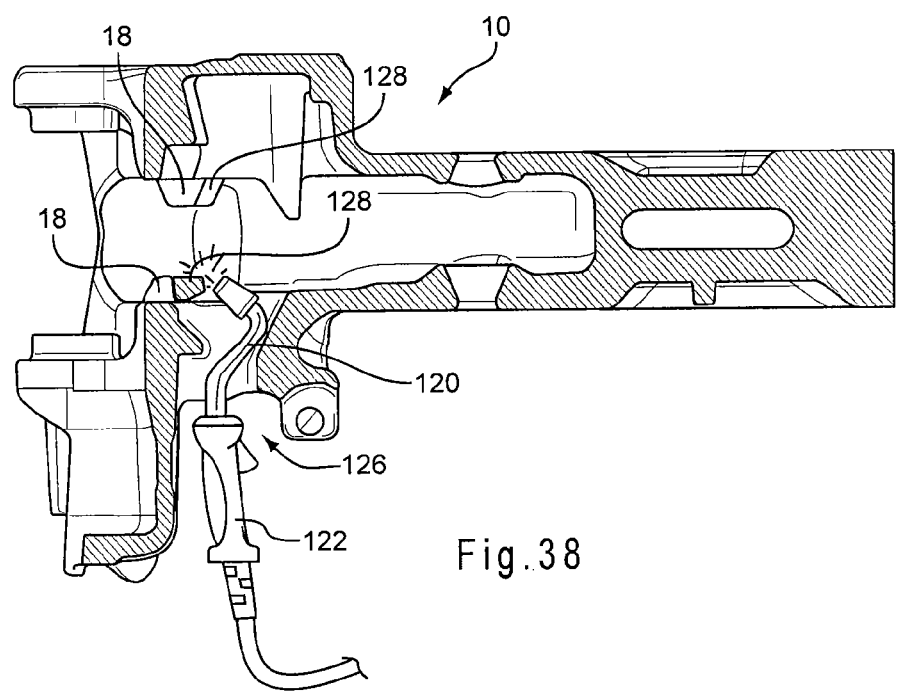
FIG. 38 is a cross-sectional view of a coupler and a MIG welder with a specialized handle entering through the lock hole.

FIGS. 37 and 38 illustrate an alternative embodiment of a system to recondition worn pulling lugs 18 on coupler bodies 10. Because of the inability to know whether or how much to build up the pulling lugs 28, or the limited accessibility to the load face of the top and bottom pulling lugs 18, these features are not currently allowed to be reconditioned by industry standards. With a custom shaped handle 120 for a MIG welder 122 or some other configuration, it is possible to access the load face 128 of the pulling lugs 18 for reconditioning either through the lock chamber opening 124 of the coupler head, or through the lock hole. The load faces 128 of the pulling lugs 18 are then built up with weld, making the surfaces larger than they were originally. A special grinder is then used to grind the welds down to the original 'like new' feature geometry.

Figure 39:
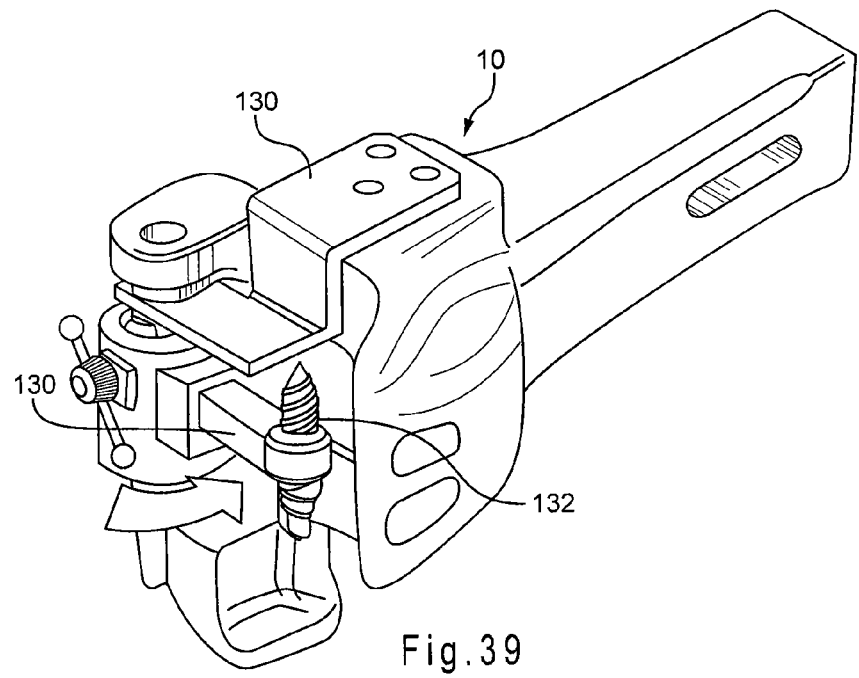
FIG. 39 is a perspective view of a device attached to the CDFs and used to finish the pulling lugs.
Figure 40:
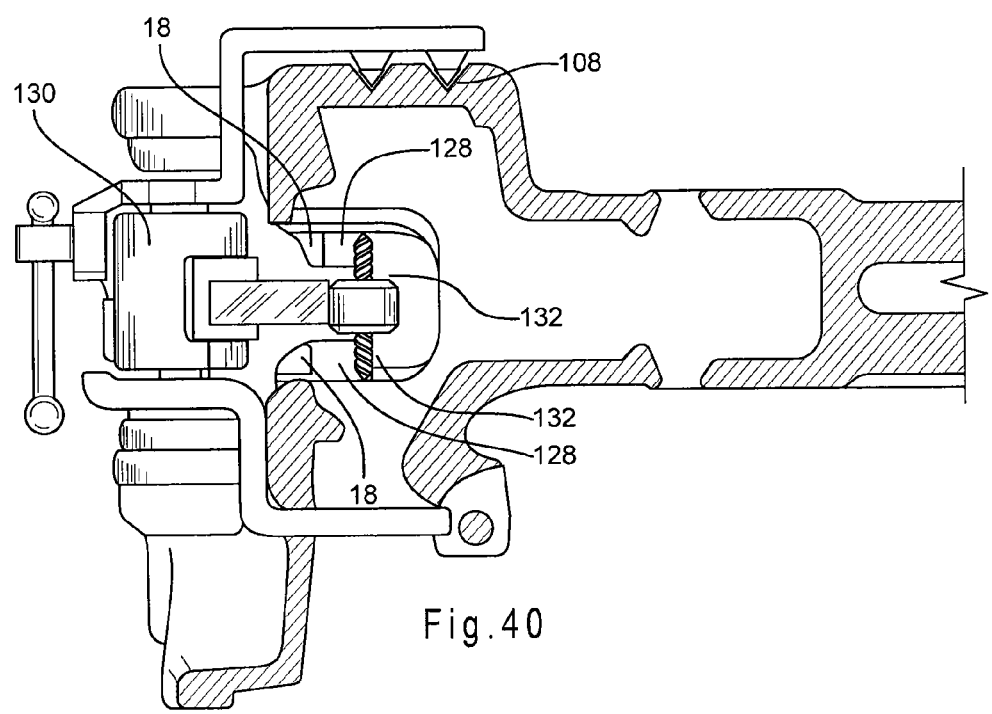
FIG. 40 is a cross-sectional view of FIG. 39.

Once the load faces 128 of the pulling lugs 18 have been built up sufficiently with welded steel, another reconditioning device 130 is clamped onto the coupler body 10, using the CDFs to locate the device's relative placement in the body as shown in FIGS. 39 and 40. This device 130 then rotates into the coupler body 10, grinding the welds down to a smooth, "like new" geometry using milling bits 132 that are shaped to the correct geometry of the load faces 128 of the pulling lugs 18. This concept assumes that sufficient weld has been built up on the pulling lug load faces 128 so that once the grinder device 130 has been run over the pulling lug load face 128 surface, there is only fresh ground material remaining that will match the coupler's 10 "like new" geometry.

Figure 41:
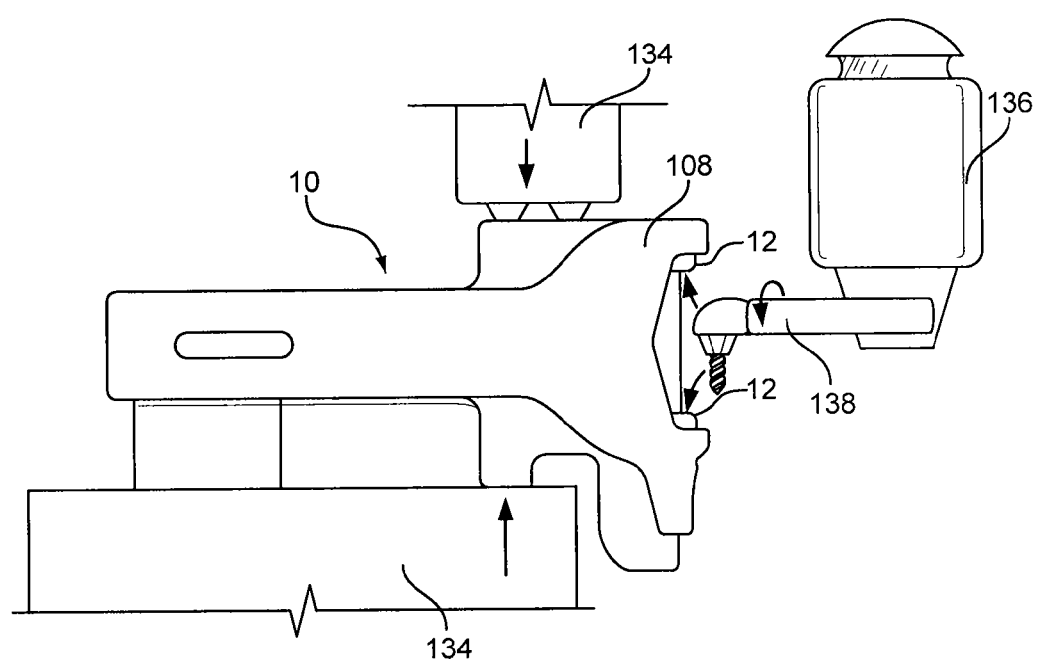
FIG. 41 is a side plan view of a coupler clamped in a jig using CDFs and a modified milling machine with a right angle milling attachment.

An alternative concept to refinishing worn features with hand tools is to use (cast or machined in) CDFs 108 to clamp a coupler body 10 into a jig 134. An embodiment of this method is illustrated in FIG. 41. A refinisher welds the wear areas, and then mounts the coupler body 10 into a modified milling machine 136. The coupler body 10 is clamped into the machine 136 using CDFs 108 to locate it (01). A right angle milling attachment 138 then cuts the C10 pin slots 12 into a "like new" condition. The milling attachment 138 would rotate 180 degrees to accommodate the top and bottom C10 pin slot 12.

It should be noted that a wide range of changes could be made to the present embodiments without departing from the scope of the claimed invention. The gauges or devices could be fitted to any portion of the coupler body that is not normally exposed to wear, and additional features could be added to other areas of the coupler body where they would not interfere with the coupler's operation. Additional areas of metal could be added or removed to form the CDF. These additional pieces or openings could be used alone or in conjunction with pre-existing non-wearing features on the coupler body, and the gauge has corresponding areas. This invention can also be used to recondition features that were not previously reconditioned. Furthermore, it could also be used to finish new castings and/or classify second hand castings.

It is therefore intended that the foregoing detailed description be regarded as illustrative rather than limiting, and that it be understood that it is the following claims, including all equivalents, that are intended to define the spirit and scope of this invention.

The invention claimed is:

1. A method for establishing a central datum feature on a railcar coupler body, comprising:
   determining a location on a surface of the coupler body that does not wear during coupler use over time, where wearing over time comprises repeated frictional contact sufficient to wear metal down to change a dimension of the coupler body such as to be in need of reconditioning; and
   establishing a central datum feature on the coupler body at the determined location and which uses the determined location as a primary reference point for reconditioning.

2. The method of claim 1, where the central datum feature comprises a location on a shank or on a back of a horn on the coupler body.

3. The method of claim 1, further comprising creating an opening on the surface of the coupler body at the determined location to serve as the central datum feature.

4. The method of claim 3, where the opening comprises a hole and the central datum feature further includes a plane running through a center of the hole.

5. The method of claim 3, further comprising:
   positioning a conical feature within the opening for stabilizing a gauge positioned within or on a surface of the coupler.

6. The method of claim 1, further comprising attaching a component to the coupler body at the determined location to serve as the central datum feature.

7. The method of claim 1, where determining a location on the surface of the coupler body comprises determining the location using a coordinate measuring machine or a probing tool.

8. The method of claim 1, where establishing the central datum feature further comprises combining the determined location with another non-wearing feature on the surface of the coupler body as a set of central datum features that act as a set of primary reference points for reconditioning.

9. The method of claim 1, further comprising:
   reconditioning, using the established central datum feature, a structure of the coupler body selected from the group consisting of a C-10 pin slot, buffing shoulders, pulling lugs and a key slot.

10. The method of claim 1, further comprising:
    establishing, in conjunction with the central datum feature, two or more of X, Y and Z planes that define axes of the coupler body.

11. A method for establishing a central datum feature for use in reconditioning a railcar coupler body, comprising:
    determining a location on a surface of the coupler body that does not wear during coupler use over time, where wearing over time comprises repeated frictional contact sufficient to wear metal down to change a dimension of the coupler body such as to be in need of reconditioning; and
    using an opening in the coupler body at the determined location to serve as a central datum feature that employs the determined location as a primary reference point for purposes of reconditioning.

12. The method of claim 11, where determining the location on the surface of the coupler body is performed before the surface has worn.

13. The method of claim 11, where the opening comprises a drain hole located in a lower half of a head of the coupler body.

14. The method of claim 11, where the opening comprises a core support hole located in a shank of the coupler body, and where the core support hole is created with a core that also sets locations of pulling lugs and buffing shoulders of a head of the coupler body.

15. The method of claim 11, further comprising:
    drilling a countersink divot into another non-wearing location on the surface of the coupler body different than the opening, to function as a secondary reference point.

16. The method of claim 11, where determining a location on the surface of the coupler body comprises determining the location using a coordinate measuring machine or a probing tool.

17. The method of claim 11, where the opening comprises opposing apertures to which a gauge is attachable, further comprising:

drilling the opposing apertures into a surface of the coupler body.

18. A method for adding at least one central datum feature to a railcar coupler body, comprising:
- determining a location on a surface of the coupler body that does not wear during coupler use over time, where wearing over time comprises repeated frictional contact sufficient to wear metal down to change a dimension of the coupler body such as to be in need of reconditioning; and
- attaching a component to the coupler body at the determined location to serve as a central datum feature that uses the determined location as a primary reference point for purposes of reconditioning.

19. The method of claim 18, where determining a location on the surface of the coupler body is performed before the surface has worn.

20. The method of claim 18, where the component attached to the coupler body comprises a precision machine component located on an outer surface of the coupler body.

21. The method of claim 18, where the component comprises a raised area of additional material.

22. The method of claim 18, where determining a location on the surface of the coupler body is performed with a probing tool and determined by computer numerical control.

23. The method of claim 18, where attaching the component to the coupler body is performed through welding.

24. The method of claim 18, where attaching the component to the coupler body comprises:
- drilling a precision hole; and
- attaching the component through the drilled precision hole to the coupler body.

25. A method for establishing a central datum feature on a railcar coupler body, comprising:
- determining a location on a surface of the coupler body that does not wear during coupler use over time, where wearing over time comprises repeated frictional contact sufficient to wear metal down to change a dimension of the coupler body to be outside of an acceptable tolerance range and in need of reconditioning as qualified for by industry standards; and
- establishing a central datum feature on the coupler body at the determined location and which uses the determined location as a primary reference.

26. The method of claim 25, further comprising:
reconditioning the coupler body by taking reference from the central datum feature.

27. The method of claim 25, further comprising:
finishing a new casting of the coupler body by taking reference from the central datum feature.

28. The method of claim 25, further comprising:
classifying the coupler body using a second-hand classification system and by taking reference from the central datum feature.

* * * * *